(12) United States Patent
Depraete

(10) Patent No.: US 10,047,845 B2
(45) Date of Patent: Aug. 14, 2018

(54) DYNAMIC ABSORBER FOR TORSIONAL VIBRATION DAMPER OF HYDROKINETIC TORQUE COUPLING DEVICE

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 14/995,601

(22) Filed: Jan. 14, 2016

(65) Prior Publication Data

US 2017/0204952 A1 Jul. 20, 2017

(51) Int. Cl.
| F16H 45/02 | (2006.01) |
| F16F 15/14 | (2006.01) |
| F16D 3/12 | (2006.01) |

(52) U.S. Cl.
CPC ............... *F16H 45/02* (2013.01); *F16D 3/12* (2013.01); *F16F 15/145* (2013.01); *F16H 2045/0226* (2013.01); *F16H 2045/0263* (2013.01)

(58) Field of Classification Search
CPC .............................................. F16H 2045/0263
See application file for complete search history.

(56) References Cited

U.S. PATENT DOCUMENTS

| 2011/0287844 A1 | 11/2011 | Steinberger |
| 2014/0353105 A1 | 12/2014 | Tomiyama |
| 2015/0337920 A1 | 11/2015 | Kawahara |
| 2015/0345565 A1 | 12/2015 | Tomiyama |
| 2015/0362041 A1 | 12/2015 | Lee et al. |

FOREIGN PATENT DOCUMENTS

| EP | 2706259 A2 | 3/2014 |
| EP | 2949963 A2 | 12/2015 |
| FR | 2928433 | 9/2009 |
| JP | 2013160323 | 8/2013 |
| WO | WO2014123174 | 8/2014 |
| WO | WO2014132906 | 9/2014 |
| WO | WO2014196340 | 12/2014 |
| WO | WO2015005379 | 1/2015 |
| WO | WO2016142732 | 9/2016 |

OTHER PUBLICATIONS

International Search Report from corresponding interntional application PCT/EP2017/050423.
International Application No. PCT/IB2015/000527 (formerly PCT/US2015/19983) filed Mar. 11, 2015, Valeo Embrayages.

*Primary Examiner* — Mark A Manley
(74) *Attorney, Agent, or Firm* — Berenato & White, LLC

(57) ABSTRACT

A torsional vibration damper assembly for a hydrokinetic torque coupling device, comprises a torsional vibration damper and a dynamic absorber operatively connected to the torsional vibration damper. The torsional vibration damper comprises a driven member rotatable about a rotational axis, a first retainer plate rotatable relative to the driven member coaxially with the rotational axis, and a plurality of damper elastic members interposed between the first retainer plate and the driven member. The damper elastic members elastically couple the first retainer plate to the driven member. The dynamic absorber includes an inertial member. The dynamic absorber is mounted to the torsional vibration damper and is rotationally guided and centered relative to the rotational axis by one of the first retainer plate and the driven member of the torsional vibration damper.

18 Claims, 24 Drawing Sheets

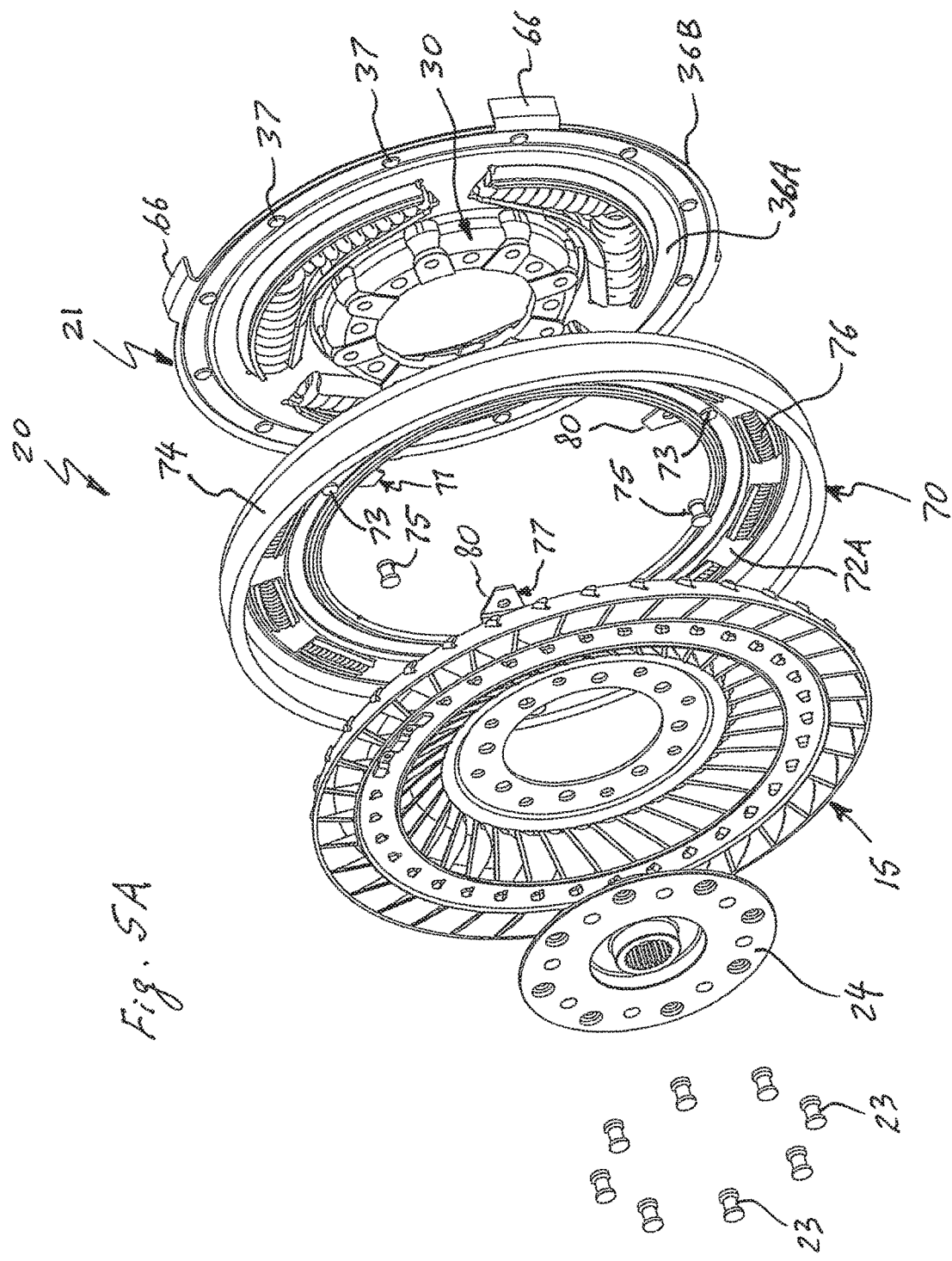

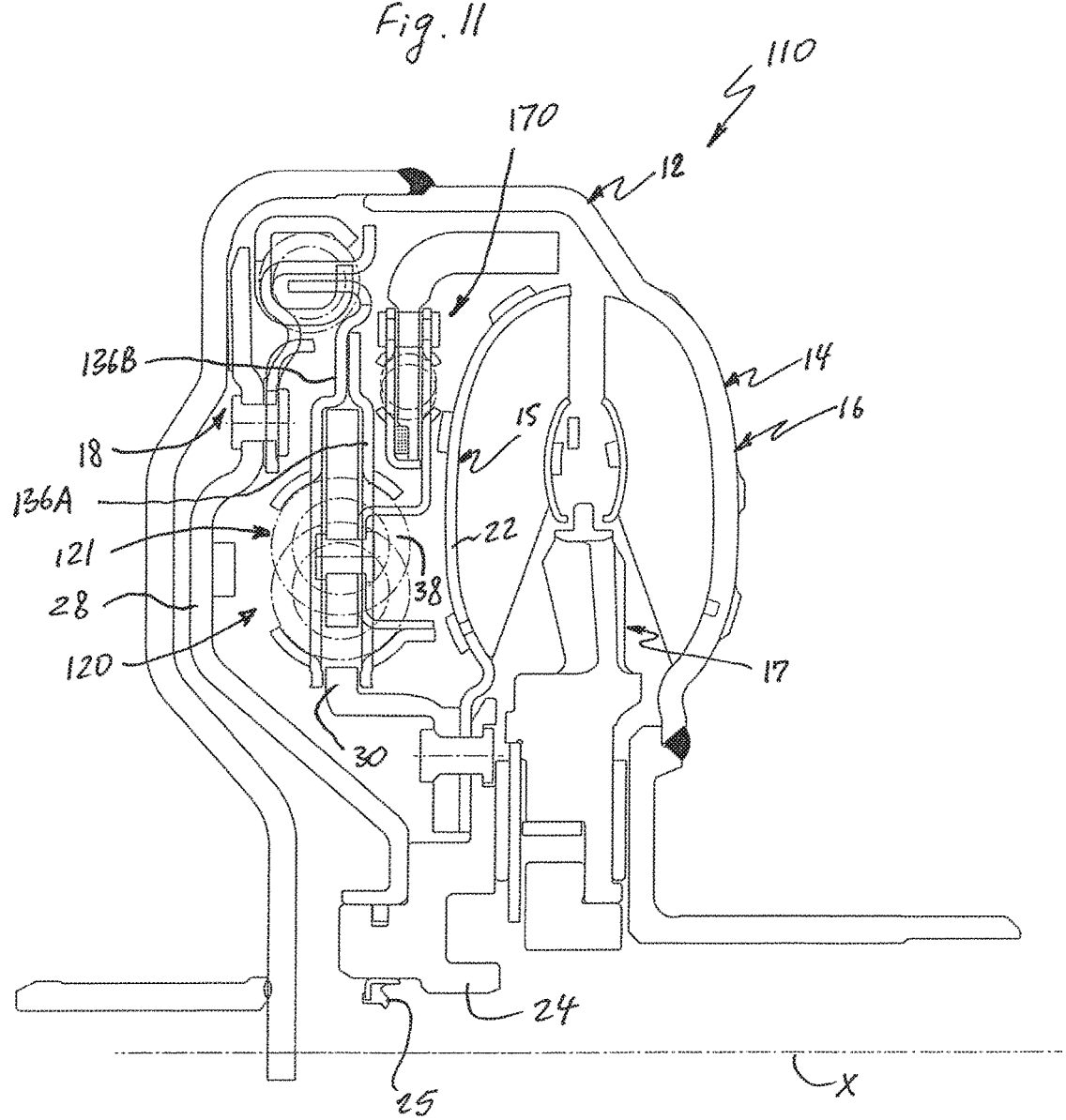

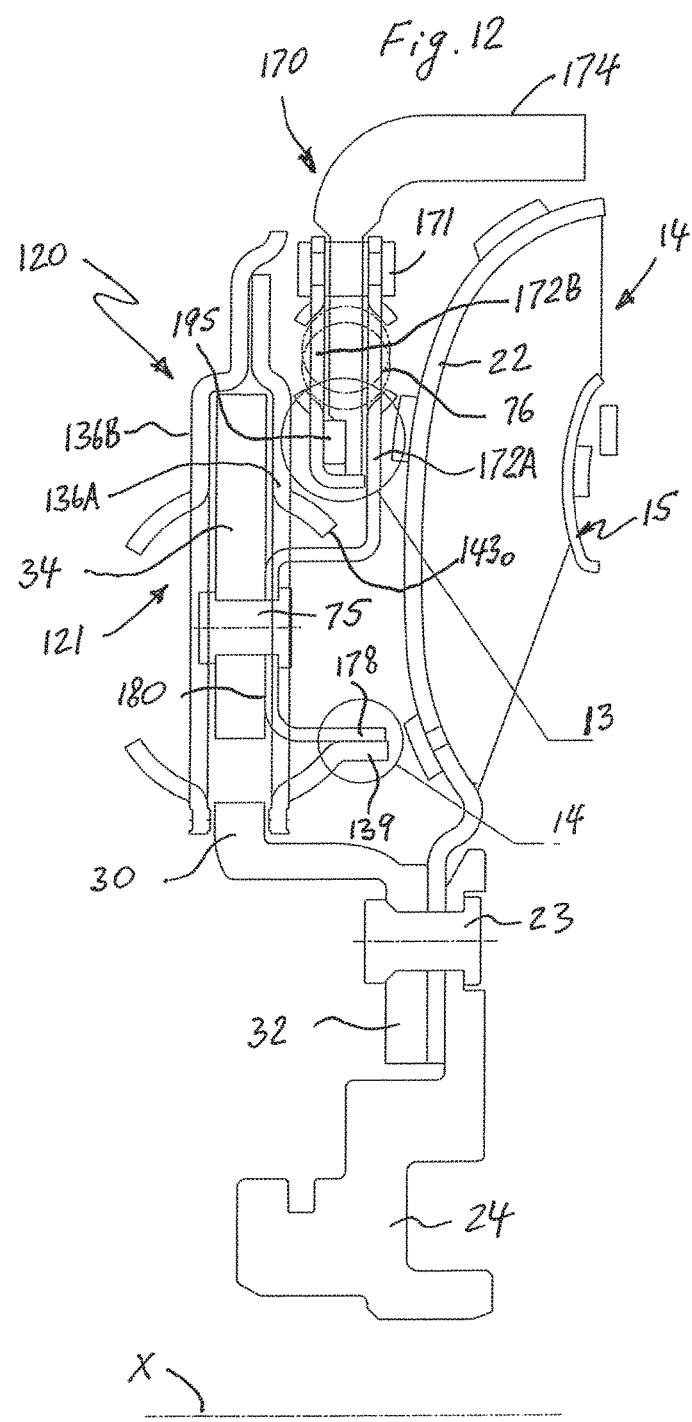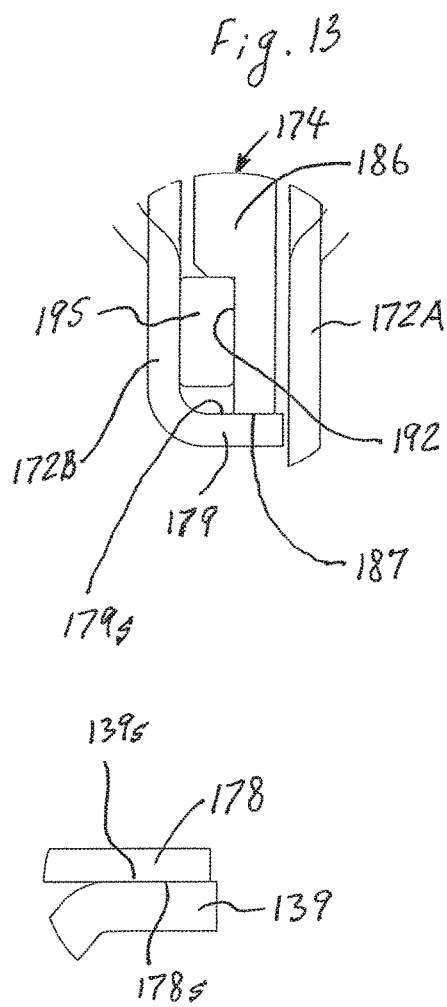

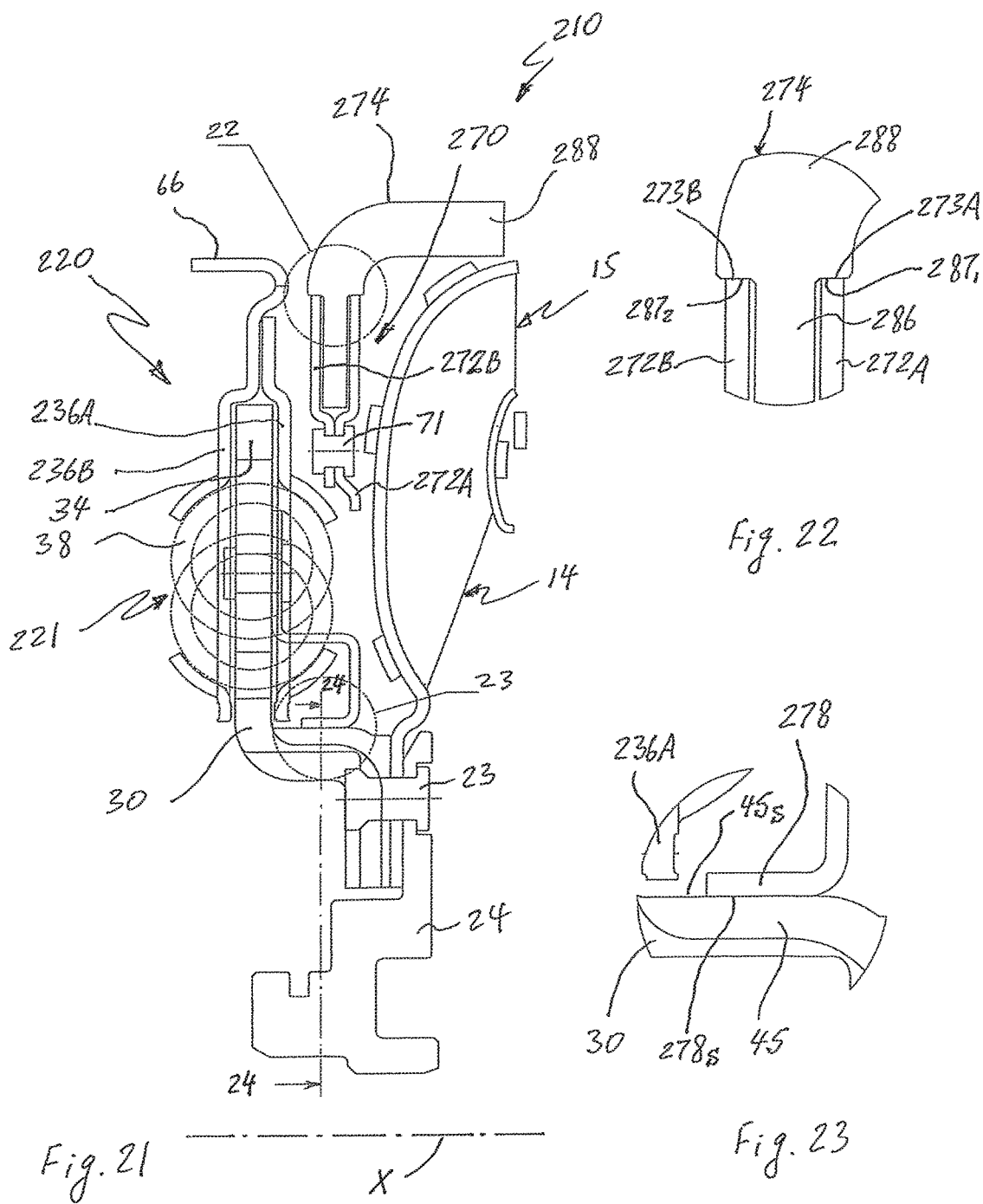

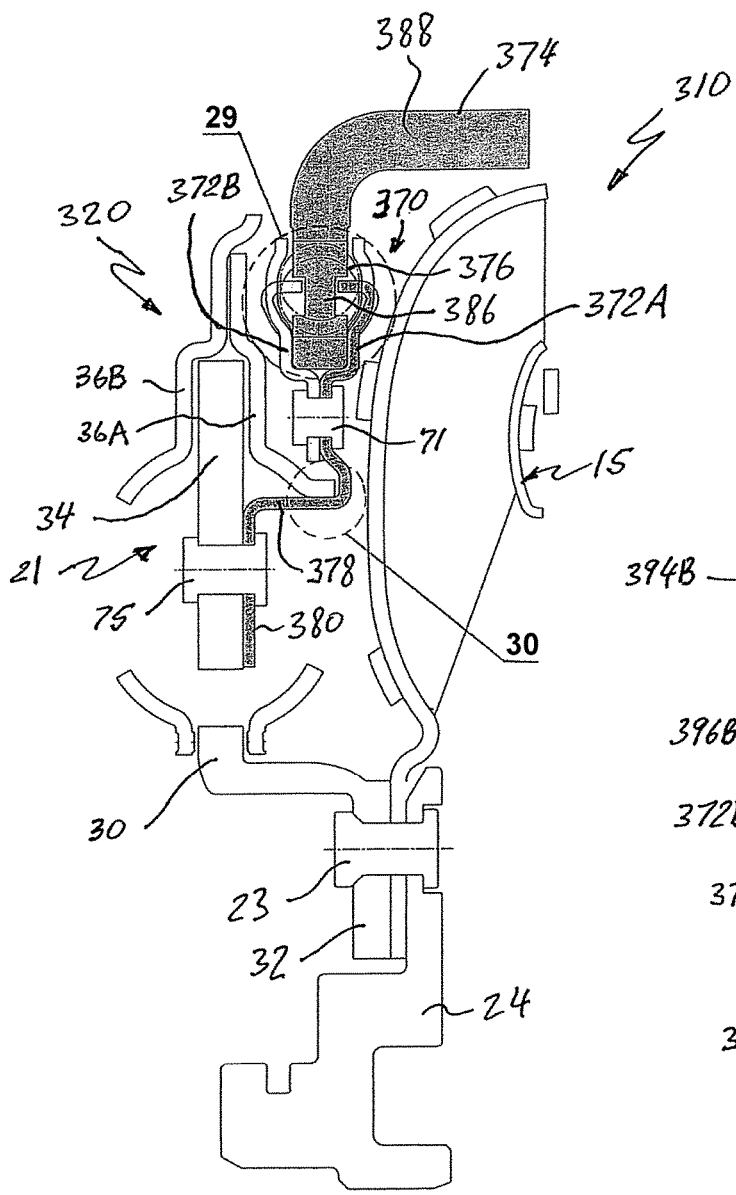
Fig. 28
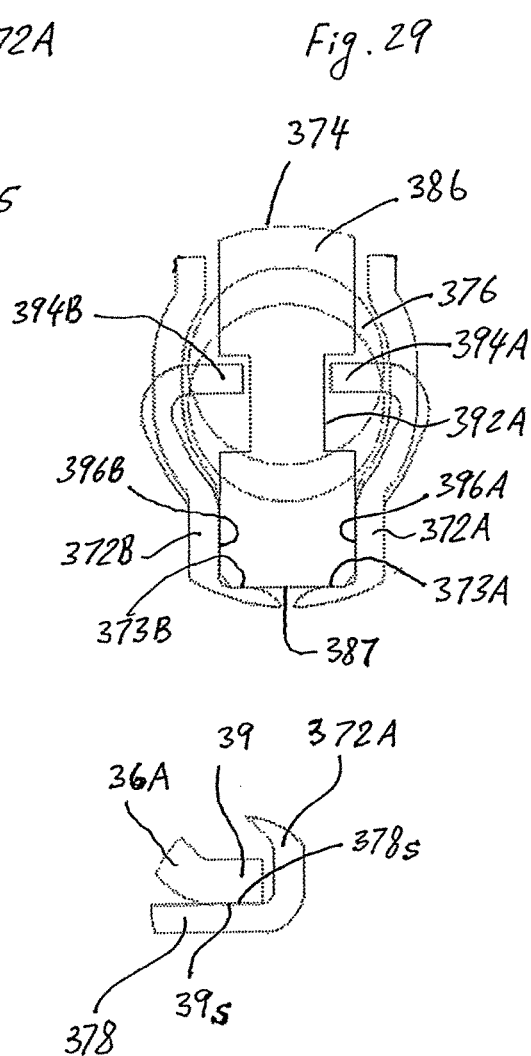
Fig. 29
Fig. 30

DYNAMIC ABSORBER FOR TORSIONAL VIBRATION DAMPER OF HYDROKINETIC TORQUE COUPLING DEVICE

BACKGROUND OF THE INVENTION

1. Field of the Invention

The present invention generally relates to hydrokinetic torque coupling devices, and more particularly to a hydrokinetic torque coupling device with a dynamic absorber for a torsional vibration damper assembly.

2. Background of the Invention

An internal combustion engine exhibits irregularities due to the succession of combustion events in the engine cylinders. Torsion damping devices allow these irregularities to be filtered before the drive torque is transmitted to an automotive transmission. This is because the vibrations preferably are damped before they enter the transmission and produce what may be considered unacceptably troublesome noise. To accomplish this, it is known to interpose a torsion damping device between a drive shaft and a transmission (or driven) shaft. The torsion damping device is generally arranged in a hydrokinetic torque coupling device that allows temporary rotational connection of the drive shaft to the transmission shaft.

Typically, a hydrokinetic torque coupling device includes a hydrodynamic torque converter and a torsion damping device positioned between an axially oriented coaxial drive shaft and a driven shaft of the automotive transmission. The torsion damping device includes a torque input element and a torque output element, and circumferentially acting elastic members. The circumferentially acting elastic members are interposed between the torque input element and the torque output element. In so-called "long travel" damping devices, the elastic members are mounted, in groups of at least two elastic members, in series between the input element and output element.

A torque converter of this kind typically has a rotating casing that is capable of transmitting drive torque to the damping device by means of a friction locking clutch, traditionally called a lock-up clutch. The torque converter also has a turbine wheel mounted rotatably inside the casing.

For some applications, the torsion damping device may also include a dynamic absorber having an inertia member. A dynamic absorber has an inertia member arranged around the rotational axis of the engine shaft and is free to oscillate around a notional axis substantially parallel to the rotational axis of the engine shaft. The dynamic absorber is provided to lower a resonance frequency at low rotational speed of the engine and further improve the vibration damping performance.

While hydrokinetic torque coupling devices and torsion damping devices with dynamic absorbers, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a torsional vibration damper assembly for a hydrokinetic torque coupling device. The torsional vibration damper assembly of the present invention comprises a torsional vibration damper, and a dynamic absorber operatively connected to the torsional vibration damper. The torsional vibration damper comprises a driven member rotatable about a rotational axis, a first retainer plate rotatable relative to the driven member coaxially with the rotational axis, and a plurality of damper elastic members interposed between the first retainer plate and the driven member. The damper elastic members elastically couple the first retainer plate to the driven member. The dynamic absorber comprises an inertial member. The dynamic absorber is mounted to the torsional vibration damper and is rotationally guided and centered relative to the rotational axis by one of the first retainer plate and the driven member of the torsional vibration damper.

According to a second aspect of the present invention, there is provided a hydrokinetic torque coupling device for coupling together a driving shaft and a driven shaft. The hydrokinetic torque coupling device of the present invention comprises an impeller coaxially aligned with a rotational axis and comprising an impeller shell, a casing comprising the impeller shell and a casing shell interconnected to and non-rotatable relative to the impeller shell, a turbine coaxially aligned with and drivable by the impeller, the turbine comprising a turbine shell, a stator situated between the impeller and the turbine, a torsional vibration damper, a turbine hub, and a dynamic absorber including an inertial member and operatively connected to the torsional vibration damper. The torsional vibration damper comprises a driven member rotatable about the rotational axis, a first retainer plate rotatable relative to the driven member coaxially with the rotational axis, and a plurality of damper elastic members interposed between the first retainer plate and the driven member. The damper elastic members elastically couple the first retainer plate to the driven member. The turbine hub is non-rotatably coupled to the turbine shell and the driven member of the torsional vibration damper. The dynamic absorber is mounted to the torsional vibration damper and is rotationally guided and centered relative to the rotational axis by one of the first retainer plate and the driven member of the torsional vibration damper.

According to a third aspect of the invention, there is provided a method for assembling a torsional vibration damper assembly for a hydrokinetic torque coupling device. The method comprises the steps of providing a preassembled torsional vibration damper comprising a driven member rotatable about the rotational axis, a first retainer plate rotatable relative to the driven member coaxially with the rotational axis, and a plurality of damper elastic members interposed between the first retainer plate and the driven member so that the damper elastic members elastically couple the first retainer plate to the driven member, providing a preassembled dynamic absorber including an inertial member, and mounting the dynamic absorber to the torsional vibration damper so that the dynamic absorber is rotationally guided and centered relative to the rotational axis by one of the first retainer plate and the driven member of the torsional vibration damper.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 5A is a front partial exploded assembly view of the torsional vibration damper assembly in accordance with the first exemplary embodiment of the present invention;

FIG. 11 is a fragmented half-view in axial section of a hydrokinetic torque coupling device in accordance with a second exemplary embodiment of the present invention;

FIG. 12 is a fragmentary cross-sectional half-view of a torsional vibration damper assembly the hydrokinetic torque coupling device in accordance with the second exemplary embodiment of the present invention;

FIG. 13 is an enlarged view of a fragment of the torsional vibration damper assembly shown in the circle "13" of FIG. 12;

FIG. 14 is an enlarged view of a fragment of the torsional vibration damper assembly shown in the circle "14" of FIG. 12;

FIG. 21 is a fragmented half-view in axial section though one of mounting portions of a dynamic absorber of a hydrokinetic torque coupling device in accordance with a third exemplary embodiment of the present invention;

FIG. 22 is an enlarged view of a fragment of the torsional vibration damper assembly shown in the circle "22" of FIG. 21;

FIG. 23 is an enlarged view of a fragment of the torsional vibration damper assembly shown in the circle "23" of FIG. 21;

FIG. 28 is a fragmentary cross-sectional half-view of a torsional vibration damper assembly the hydrokinetic torque coupling device in accordance with a fourth exemplary embodiment of the present invention;

FIG. 29 is an enlarged view of a fragment of the torsional vibration damper assembly shown in the circle "29" of FIG. 28; and FIG. 30 is an enlarged view of a fragment of the torsional vibration damper assembly shown in the circle "30" of FIG. 28.

Figure 1:
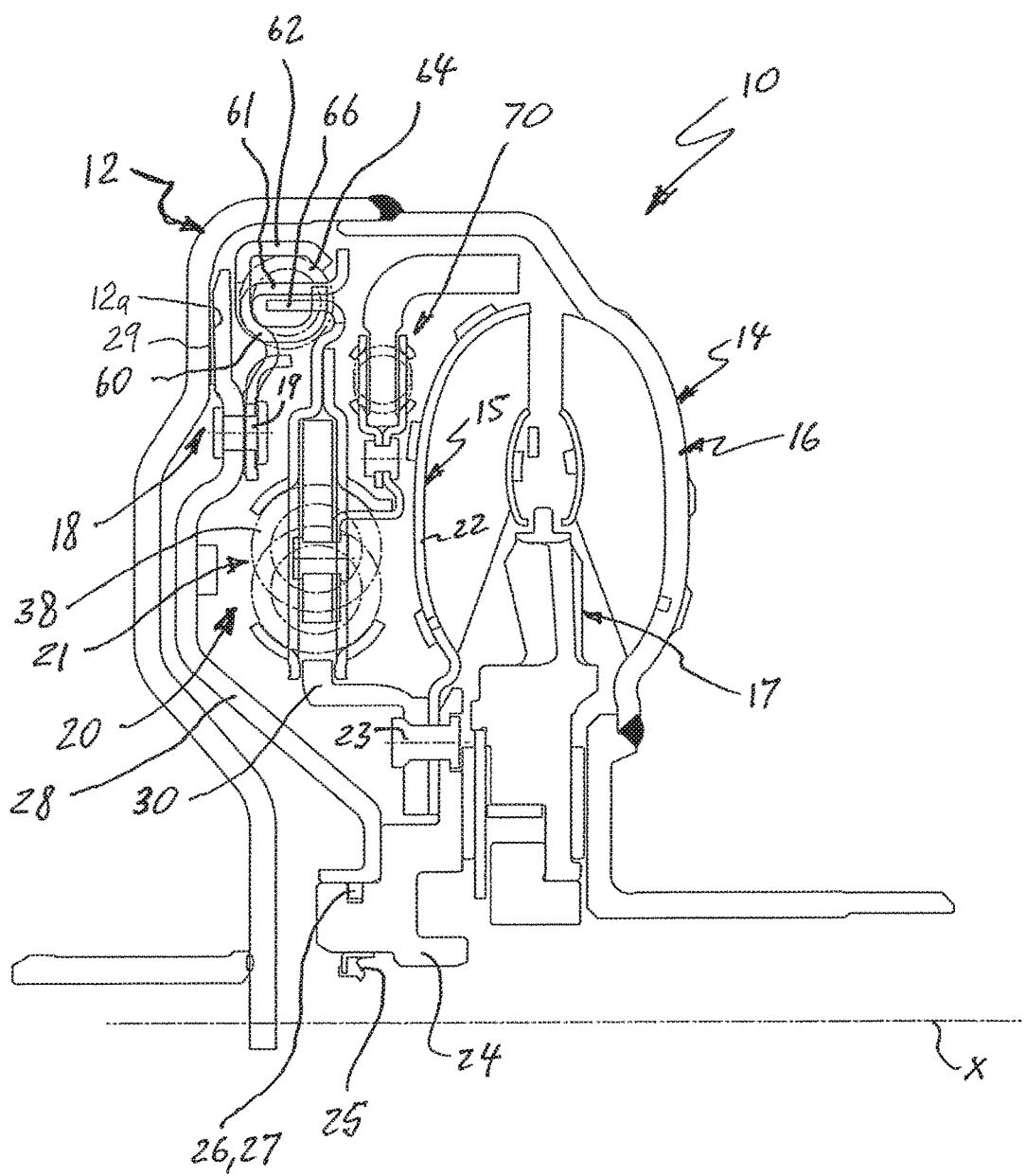
FIG. 1 is a fragmented half-view in axial section of a hydrokinetic torque coupling device in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable in known manner to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 comprises a sealed casing 12 filled with oil and rotatable about a rotational axis X. The hydrokinetic torque coupling device 10 further comprises a hydrodynamic torque converter 14, a lock-up clutch 18 and a torsional vibration damper assembly (also referred to herein as a damper assembly) 20, all disposed in the sealed casing 12. The torsional vibration damper assembly 20 is mounted to the torque converter 14. Hereinafter the axial and radial orientations are considered with respect to the rotational axis X of the torque coupling device 10.

The torque converter 14, the lock-up clutch 18 and the torsional vibration damper assembly 20 are all rotatable about the rotational axis X. The torque converter 14 comprises a turbine wheel 15, an impeller wheel 16, and a reactor (or stator) 17 interposed axially between the turbine wheel 15 and the impeller wheel 16. The turbine wheel 15 includes a substantially semi-toroidal turbine shell 22, as best shown in FIG. 1.

The torque coupling device 10 also includes a substantially annular turbine (or output) hub 24 rotatable about the rotational axis X, which is arranged to non-rotatably couple together the driven shaft and the turbine wheel 15. In the following description, axial and radial orientations will be considered with respect to the rotational axis X of the turbine hub 24.

The turbine shell 22 of the turbine wheel 15 is non-movably (i.e., fixedly) secured to the turbine hub 24 by any appropriate means, such as by rivets 23 or welding. The turbine hub 24 has internal splines and is non-rotatably coupled to the driven shaft, such as an input shaft of the automatic transmission of the motor vehicle, which is provided with complementary external splines. Alternatively, a weld or other connection may be used to fix (i.e., non-movably secure) the turbine hub 24 to the driven shaft. A radially outer surface of the turbine hub 24 includes an annular slot 26 for receiving a sealing member 27, such as an O-ring. The turbine hub 24 is rotatable about the rotational axis X and is coaxial with the driven shaft so as to center the turbine wheel 15 on the driven shaft. A sealing member 25 (shown in FIG. 1), mounted to a radially inner peripheral surface of the turbine hub 24, creates a seal at the interface of the transmission input shaft and the turbine hub 24.

The lock-up clutch 18 is provided for locking the driving and driven shafts. The lock-up clutch 18 is generally activated after starting of the motor vehicle and after hydraulic coupling of the driving and driven shafts, in order to avoid the loss of efficiency caused in particular by slip phenomena between the turbine wheel 15 and the impeller wheel 16. Specifically, the lock-up clutch 18 is provided to bypass the turbine wheel 15 when in the closed state. When the lock-up clutch 18 is in the engaged (locked) position, the engine torque is transmitted by the casing 12 to the turbine hub 24 through the torsional vibration damper assembly 20.

The lock-up clutch 18 includes a substantially annular locking piston 28 including an annular friction liner 29 fixedly attached to an axially outer surface of the locking piston 28 that faces locking wall 12a of the casing 12 by any appropriate means known in the art, such as by adhesive bonding. As best shown in FIG. 1, the friction liner 29 is fixedly attached to the axially outer surface of the locking piston 28 at a radially outer peripheral end thereof. The locking piston 28 is slidably mounted to the turbine hub 24 for axially reciprocating movement thereon.

The locking piston 28 is axially displaceable toward (an engaged (or locked) position of the lock-up clutch 18) and away (a disengaged (or open) position of the lock-up clutch 18) from the locking wall 12a inside the casing 12. Moreover, the locking piston 28 is axially displaceable away from (the engaged (or locked) position of the lock-up clutch 18) and toward (the disengaged (or open) position of the lock-up clutch 18) the turbine hub 24.

The torsional vibration damper assembly 20 advantageously allows the impeller wheel 16 of the torque converter 14 to be coupled, with torque damping, to the turbine hub 24, and thus to the input shaft of the automatic transmission. The torsional vibration damper assembly 20 also allows damping of stresses between a first, drive shaft (not shown), and a second, driven shaft (not shown), that are coaxial with the rotational axis X, with torsion damping.

The torsional vibration damper assembly 20, as best shown in FIGS. 1, 2, 5A-6, is disposed between the turbine hub 24 that is fixedly (i.e., non-movably) connected with the turbine shell 22 of the turbine wheel 15, and the locking piston 28 of the lock-up clutch 18. Moreover, the locking piston 28 of the lock-up clutch 18 is rotatably coupled to the turbine wheel 15 and the turbine hub 24 by the torsional vibration damper 20. The torsional vibration damper assembly 20 is arranged on the turbine hub 24 in a limited, movable and centered manner. The turbine hub 24 forms an output part of the torsional vibration damper assembly 20 and a driven side of the torque coupling device 10, and is splined with the driven shaft. The locking piston 28, on the other hand, forms an input part of the torsional vibration damper 20.

During vehicle operation, when the lock-up clutch 18 is in the disengaged (open) position, the engine torque is transmitted by the turbine wheel 15 of the torque converter 14 from the impeller wheel 16 to the turbine hub 24, bypassing the torsional vibration damper assembly 20. However, when the lock-up clutch 18 is in the engaged (locked) position, the engine torque is transmitted by the casing 12 to the turbine hub 24 through the torsional vibration damper assembly 20.

Figure 2:
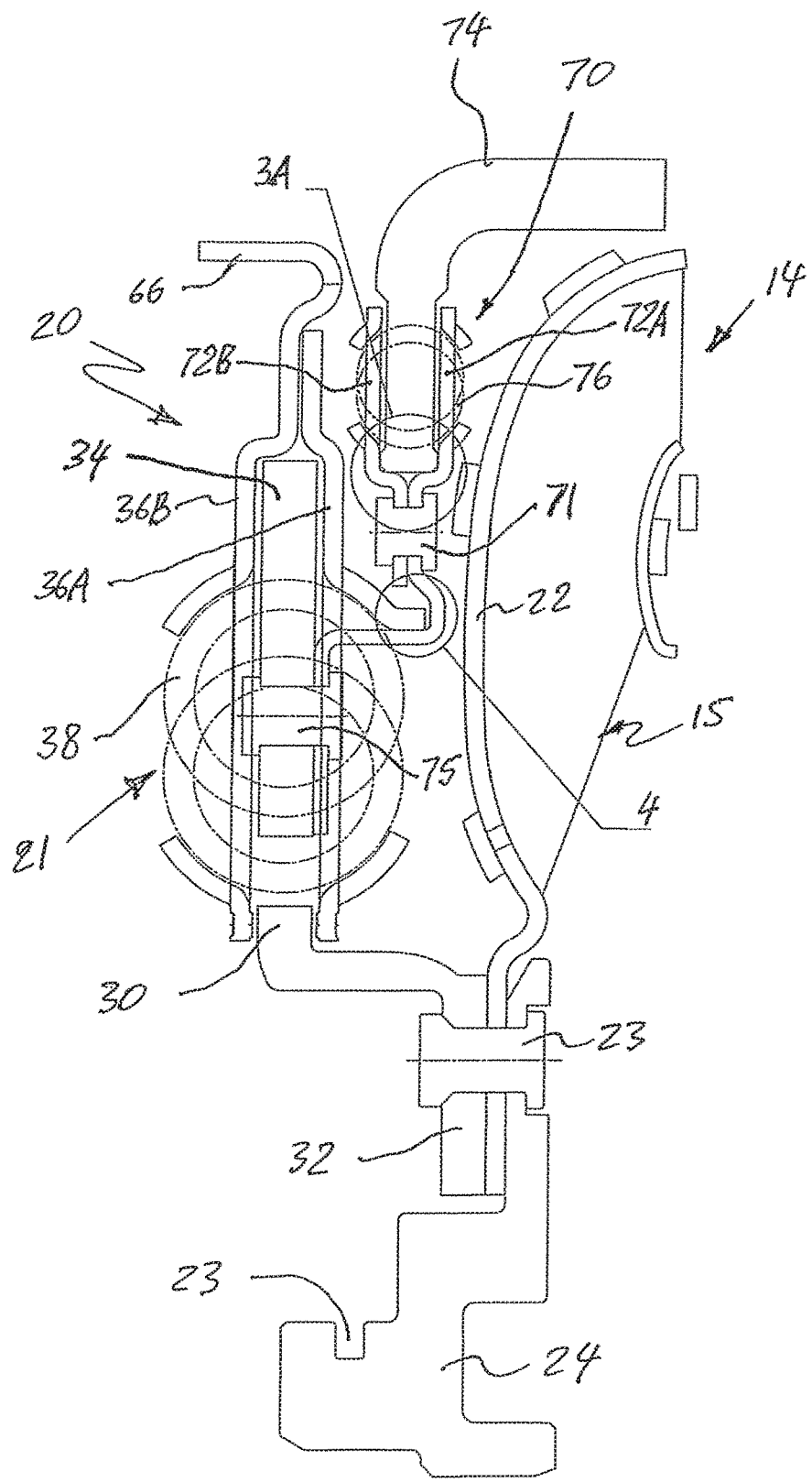
FIG. 2 is a fragmentary cross-sectional half-view of a torsional vibration damper assembly the hydrokinetic torque coupling device in accordance with the first exemplary embodiment of the present invention.

As best shown in FIGS. 1, 2 and 5, the torsional vibration damper assembly 20 includes a torsional vibration damper 21 operatively coupled to the turbine wheel 15 and the turbine hub 24 of the torque converter 14, and a dynamic absorber 70 operatively connected to the torsional vibration damper 21.

As best shown in FIGS. 1, 2 and 5, the torsional vibration damper 21 comprises a substantially annular driven member 30 fixedly (i.e., non-movably) secured to the turbine hub 24, and a substantially annular intermediate member 34 mounted about the driven member 30 and rotatably moveable relative thereto. The driven member 30 has an integrally formed and radially inwardly extending flange 32. The flange 32 of the driven member 30 is fixedly (i.e., non-movably) secured to the turbine hub 24 by any appropriate means, such as by the rivets 23 or welding. Thus, the turbine shell 22 of the turbine wheel 15 is fixedly secured to both the turbine hub 24 and the driven member 30 by any appropriate means, such as by the rivets 23 or welding. The driven member 30 constitutes an output member of the torsional vibration damper 21.

The torsional vibration damper 21 further comprises a substantially annular first retainer plate 36A and a substantially annular second retainer plate 36B, and a plurality of circumferentially acting damper elastic members (or torque transmitting elements) 38 disposed in series relative to each other between the driven member 30 and the first and second retainer plates 36A, 36B, as best shown in FIG. 2. The first and second retainer plates 36A, 36B are mounted adjacent to axially opposite sides (surfaces) of the driven member 30 and the intermediate member 34 so as to be oriented parallel to each other and coaxially with the rotational axis X. The first and second retainer plates 36A, 36B are non-movably (i.e., fixedly) secured to one another by any appropriate means, such as by fasteners or welding, so as to rotatable relative to the driven member 30. Thus, the first and second damper retainer plates 36A, 36B are non-rotatable relative to one another, but rotatable relative to the driven member 30 and the intermediate member 34. Each of the damper elastic members 38 is disposed circumferentially between the driven member 30 and the first and second damper retainer plates 36A, 36B.

Figure 6:
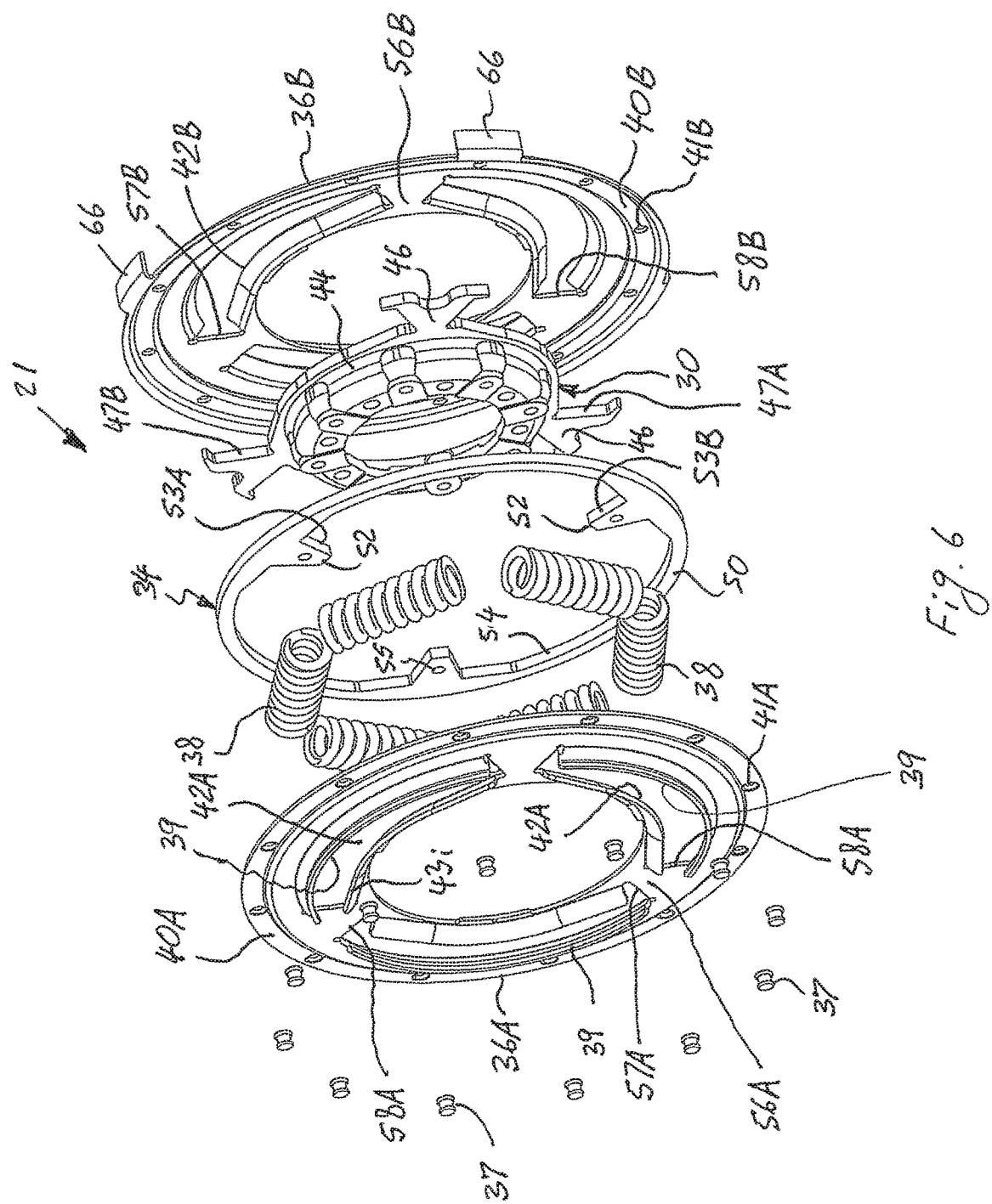
FIG. 6 is a perspective exploded view of a torsional vibration damper of the torsional vibration damper assembly in accordance with the first exemplary embodiment of the present invention.

According to the first exemplary embodiment of the present invention, the damper elastic members 38 are identical to each other. In non-limiting fashion, the torsional vibration damper 21 according to the first exemplary embodiment of the present invention has six damper elastic members 38, as best shown in FIG. 6. Further according to the present invention, each of the damper elastic members 38 is in the form of helical (or coil) spring having a principal axis oriented substantially circumferentially. Furthermore according to the first exemplary embodiment of the present invention, each of the damper elastic members 38 includes only one coaxial helical spring. Alternatively, each of the damper elastic members 38 may include a pair of coaxial helical springs. Specifically, each of the damper elastic members 38 may include an external large-diameter spring and an internal small-diameter spring, arranged coaxially so that the internal spring is disposed within the external spring.

Moreover, the first and second retainer plates 36A, 36B are arranged axially on either side of the damper elastic members 38 and are operatively connected therewith. The first and second retainer plates 36A, 36B are non-movably (i.e., fixedly) secured to one another by any appropriate means, such as by rivets 37 or welding, so as to be rotatable relative to the driven member 30. Thus, the first and second retainer plates 36A, 36B are non-rotatable relative to one another, but rotatable relative to the driven member 30 and the intermediate member 34. Each of the damper elastic members 38 is disposed circumferentially between the driven member 30 and the intermediate member 34.

According to the first exemplary embodiment of the present invention as best illustrated in FIG. 6, the first retainer plate 36A has a substantially annular outer mounting flange 40A provided with a plurality of circumferentially spaced holes 41A. The second retainer plate 36B, on the other hand, has a substantially annular outer mounting flange 40B provided with a plurality of circumferentially spaced holes 41B. The first and second retainer plates 36A, 36B are non-movably (i.e., fixedly) secured to one another so that the outer mounting flanges 40A, 40B of the first and second retainer plates 36A, 36B engage axially opposite surfaces thereof by rivets 37 extending through the holes 41A, 41B in the outer mounting flanges 40A, 40B of the first and second damper retainer plates 36A, 36B. Thus, the first and second retainer plates 36A, 36B are non-rotatable relative to one another, but rotatable relative to the driven member 30 and the intermediate member 34.

Each of the first and second retainer plates 36A, 36B is provided with a plurality of circumferentially extending windows (or window-shaped openings) 42A, 42B, respectively, each of which is arranged in correspondence with a pair of the inner elastic damping members 38, as best depicted in FIGS. 1, 5 and 6.

The windows 42A, 42B are separated circumferentially from one another alternately by radial tabs 56A, 56B. Each of the first and second retainer plates 36A, 36B according to the first exemplary embodiment of the present invention has three windows 42A, 42B and three radial tabs 56A, 56B. Moreover, each of the windows 42A, 42B, or each of the radial tabs 56A, 56B, is delimited circumferentially by a first radial end face 57A, 57B on the one hand, and by a second radial end face 58A, 58B on the other hand, oriented circumferentially opposite to each other. Thus, each of the radial tabs 56A, 56B is interposed circumferentially between the two damper elastic members 38 in series of each pair. The first radial end face 57A, 57B and the second radial end face 58A, 58B that are interposed between the damper elastic members 38 of a single pair are thus carried by one common radial tab 56A, 56B.

Moreover, according to the present invention, the first retainer plate 36A is provided with one or more circumferentially extending guiding flanges 39 extending axially outwardly from the first retainer plate 36A toward the turbine shell 22. Each of the one or more guiding flanges 39 has a circumferentially extending guiding surface 39$s$ (best shown in FIGS. 3 and 4) facing a radially inner edge 43$i$ of each of the windows 42A disposed radially opposite to a radially outer edge 43$o$ thereof.

According to the first exemplary embodiment of the present invention, the radially outer edge 43$o$ of each of the windows 42A of the first retainer plate 36A is provided with the circumferentially extending guiding flange 39 extending axially outwardly from the first retainer plate 36A toward the turbine shell 22. Each of the guiding flanges 39 is in the form of an annular segment and has a circumferentially extending guiding surface 39$s$ facing the radially inner edge 43$i$ of each of the windows 42A disposed radially opposite to the radially outer edge 43$o$ thereof. In non-limiting fashion, each of the circumferentially extending guiding surfaces 39$s$ is in the form of a surface of revolution, such as a substantially curvilinear or cylindrical surface. According to the first exemplary embodiment of the present invention, as best shown in FIG. 6, the first retainer plate 36A has three guiding flanges 39.

Further according to the first exemplary embodiment of the present invention, as best shown in FIG. 6, each of the first and second damper retainer plates 36A, 36B is preferably a stamped member of suitable metallic construction being an integral part, e.g., made of a single or unitary component, but may be separate components fixedly connected together. Preferably, the circumferentially extending guiding flanges 39 are integrally press-formed on the first retainer plate 36A so as to be equiangularly spaced from each other.

Figure 7:
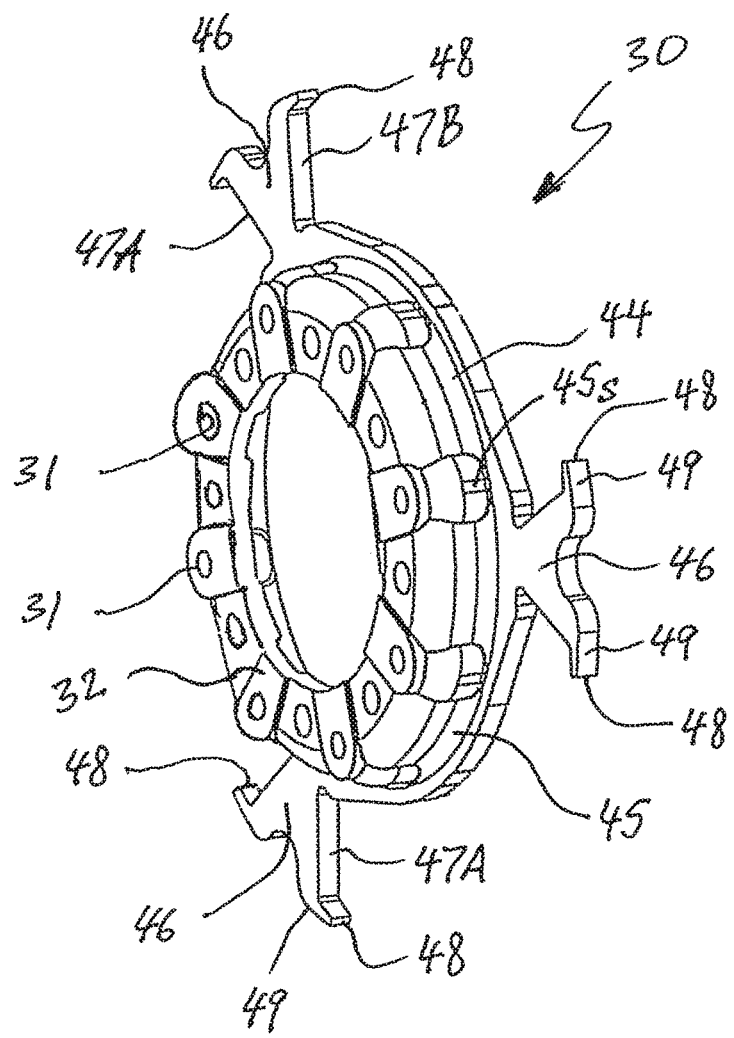
FIG. 7 is a perspective view of a driven member of the torsional vibration damper in accordance with the first exemplary embodiment of the present invention.

The driven member 30, best shown in FIGS. 6 and 7, includes a substantially annular central portion 44, with a plurality of external radial lugs 46 extending radially outwardly from the central portion 44. The external radial lugs 46 cooperate with the circumferentially acting radially inner damper elastic members (or torque transmitting elements) 38. Each of the external lugs 46 of the driven member 30 and the central portion 44 are preferably integral with one another, e.g., made of a single or unitary component, but may be separate components fixedly connected together.

The external lugs 46 are spaced apart circumferential equidistantly around the rotational axis X. Each of the external radial lugs 46 has circumferentially positioned first and second radial retention faces 47A and 47B, respectively, engaging the damper elastic members 38. Also, each of the external radial lugs 46 has two circumferentially opposite, circumferentially extending gripping portions 48, as best shown in FIGS. 6 and 7, that retain the distal ends of the damper elastic members 38 on the retention faces 47A and 47B of each of the external radial lugs 46. Each of the external radial lugs 46 has a substantially cylindrical outer peripheral surface 49. The central portion 44 of the driven member 30 is provided with a plurality of circumferentially spaced holes 31. The driven member 30 is fixedly secured to the turbine hub 24 by the rivets 23 extending through the holes 31 in the central portion 44 of the driven member 30.

Figure 5B:
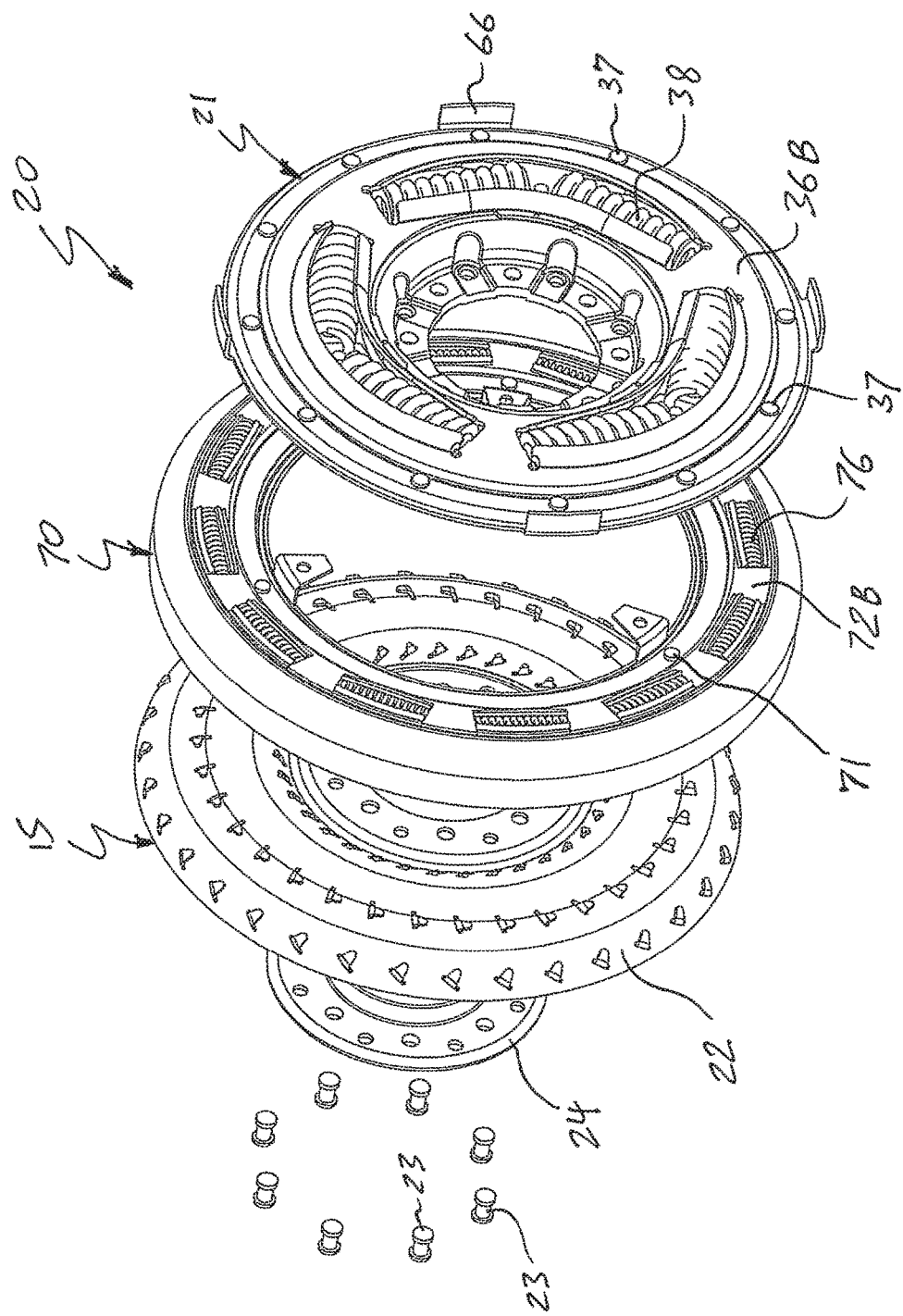
FIG. 5B is a rear partial exploded assembly view of the torsional vibration damper assembly in accordance with the first exemplary embodiment of the present invention.

Similarly, as best shown in FIG. 6, the intermediate member 34 is formed with a plurality of internal radial lugs 52 which cooperate with the circumferentially acting damper elastic members 38. As illustrated in FIG. 6, the internal radial lugs 52 extend radially inwardly from a generally annular body portion 50 of the intermediate member 34. Moreover, the internal radial lugs 52 are spaced apart circumferentially equidistantly around the rotational axis X. Each of the internal radial lugs 52 has circumferential first and second radial retention faces 53A and 53B, respectively. As best shown in FIG. 6, the first retention faces 53A of the internal radial lugs 52 of the intermediate member 34 face the first retention faces 47A of the external radial lugs 46 of the driven member 30 and engage the damper elastic members 38, while the second retention faces 53B of the internal radial lugs 52 of the intermediate member 34 face the second retention faces 47B of the external radial lugs 46 of the driven member 30 and engage the damper elastic members 38. In non-limiting fashion, in accordance with the first exemplary embodiment of the present invention, each of the internal radial lugs 52 has a substantially frustotriangular shape extending radially inwardly. The substantially cylindrical outer peripheral surface 49 of each of the radial lugs 46 of the driven member 30 is adjacent and complementary to a substantially cylindrical inner peripheral surface 54 of the body portion 50 of the intermediate member 34, and serves to center the intermediate member 34 with respect to the rotational axis X. As further shown in FIGS. 5A and 5B, each of the damper elastic members 38 is disposed and compressed between the external radial lugs 46 of the driven member 30 and the internal radial lugs 52 of the intermediate member 34 in order to damp sudden changes in torque. Moreover, each of the windows 42A, 42B receives a single pair of the damper elastic members 38 separated by an internal radial lug 52 of the intermediate member 34, as best shown in FIGS. 5 and 6.

The torsional vibration damper 21 further comprises a substantially annular drive member 60 and a substantially annular connecting member 62 rotatably coupled to the drive member 60 (as best shown in FIG. 1). The driven member 30 is rotatably moveable relative to both the drive member 60 and the connecting member 62. The drive member 60 constitutes an input member of the torsional vibration damper 21, while the driven member 30 constitutes an output member of the torsional vibration damper 21. As best shown in FIGS. 1-6, the drive member 60, the connecting member 62 and the annular driven member 30 are coaxial with each other and rotatable about the rotational axis X. The drive member 60 is non-movably (i.e., fixedly) secured to the locking piston 28 by any appropriate means, such as by rivets 19 or welding. The driven member 30 is operatively associated with the turbine wheel 15 and coaxial with the turbine hub 24. The turbine shell 22 of the turbine wheel 5 is fixedly secured to both the turbine hub 24 and the driven member 30 by any appropriate means, such as by the rivets 23 or welding.

The annular drive member 60 includes external (or peripheral), radially outwardly extending driving tabs (or abutment elements) 61 circumferentially equidistantly disposed about an outer periphery thereof for driving engagement with the damper assembly 21, as described below. The drive member 60 with the driving tabs 61 is preferably an integral part, e.g., made of a single or unitary component, but may be separate components fixedly connected together. Preferably, the driving tabs 61 are integrally press-formed on the drive member 60 so as to be equiangularly spaced from each other.

The connecting member 62 includes internal, radially inwardly extending tabs (or abutment elements) circumferentially equiangularly disposed about an inner periphery thereof. The connecting member 62 is preferably a stamped member of suitable metallic construction with the inwardly extending tabs preferably being an integral part, e.g., made of a single or unitary component, but may be separate components fixedly connected together. Preferably, the inwardly extending tabs are integrally press-formed on the connecting member 62 so as to be equiangularly spaced from each other.

The torsional vibration damper 21 further comprises a plurality of ancillary (or radially outer) damper elastic members (or torque transmitting elements) 64, such as coil springs (damper springs) disposed in series relative to each other between the drive member 60 and the connecting member 62, as best shown in FIG. 1. As best shown in FIG. 1, the ancillary damper elastic members (or the outer damper elastic members) 64 are disposed radially outwardly of the damper elastic members (or the inner damper elastic members) 38. The radially outer damper elastic members 64 include circumferentially acting elastic members, such as coil springs, disposed in series relative to each other between the drive member 60 and the connecting member 62, as best shown in FIG. 1. The ancillary damper elastic members 64 are distributed circumferentially around the rotational axis X. As further illustrated in FIG. 1, the radially inner and outer elastic damping members 38, 64, respectively, are radially spaced from each other.

The connecting member 62 defines a substantially annular groove (or channel) that partially houses the ancillary damper elastic members 64, which are distributed about the circumference of the annular groove of the connecting member 62 so as to support the ancillary damper elastic members 64 against centrifugal force. Moreover, each of the ancillary damper elastic members 64 is disposed circumferentially between the driving tabs 61 of the drive member 60 and the internal tabs of the connecting member 62.

As best shown in FIGS. 1 and 2, the first retainer plate 36B further includes one or more peripheral abutment elements 66 extending axially outwardly from the outer mounting flange 40B of the second retainer plate 36B away from the first retainer plate 36A toward the drive member 60 and the locking piston 28. According to the first exemplary embodiment of the present invention, the abutment elements 66 are integrally press-formed on the second retainer plate 36B so as to be equiangularly spaced from each other. The abutment elements 66 have circumferentially opposite abutment surfaces on circumferential ends of the mutually facing abutment elements 66. The abutment elements 66 of the second damper retainer plate 36B engage the ancillary damper elastic members 64. Thus, the second damper retainer plate 36B is operatively and rotatably connected to the drive member 60 through the ancillary damper elastic members 64.

The ancillary damper elastic members 64 are held in the interface between the internal tabs of the connecting member 62, the driving tabs 61 of the drive member 60 and the abutment elements 66 of the second damper retainer plate 36B so as to transmit damped rotational torque from the locking piston 28 to the first and second retainer plates 36A, 36B through the radially outer damper elastic members 64 and the connecting member 62. As best shown in FIG. 1, the driving tabs 61 of the drive member 60 and the abutment elements 66 of the second damper retainer plate 36B are circumferentially (or angularly) aligned with each other. In other words, the connecting member 62 is drivingly connected to the first and second damper retainer plates 36A, 36B through the radially outer damper elastic members 64. In turn, the drive member 60 is drivingly connected to the connecting member 62 through the radially outer damper elastic members 64. Thus, the radially outer damper elastic members 64 are disposed and are compressible between the driving tabs 61 of the drive member 60 and the internal tabs of the connecting member 62, and between the driving tabs 61 of the drive member 60 and the abutment elements 66 of the second damper retainer plate 36B.

During operation, when the lock-up clutch 18 is in the disengaged (open) position, the engine torque is transmitted from the impeller wheel 16 by the turbine wheel 15 of the torque converter 14 to the turbine hub 24. When the lock-up clutch 18 is in the engaged (locked) position (i.e., when the locking piston 28 is engaged (or locked) against the locking wall 12a of the casing 12 by action of the hydraulic pressure), the engine torque is transmitted by the casing 12 to the turbine hub 24 through the torsional vibration damper assembly 20.

Figure 4:
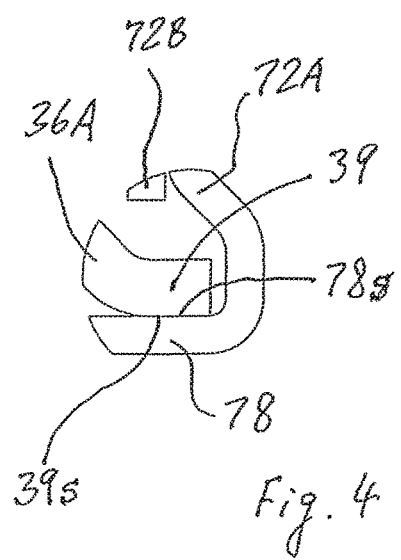
FIG. 4 is an enlarged view of a fragment of the torsional vibration damper assembly shown in the circle "4" of FIG. 2.

The dynamic absorber 70 of the torsional vibration damper assembly 20 is operatively connected to the intermediate member 34 of the torsional vibration damper 21. The dynamic absorber 70 is rotationally guided and radially centered relative to the rotational axis X by rotationally slidingly engaging the first retainer plate 36A of the torsional vibration damper 21, as best shown in FIGS. 2 and 4. The dynamic absorber 70 functions as a dynamic damper for further dampening the torsional vibration (variation in speed of rotation) transmitted to the driven member 30 of the torsional vibration damper 21.

The dynamic absorber 70 includes a substantially annular first connecting plate 72A non-rotatably attached to the intermediate member 34 coaxially with the rotational axis X, a substantially annular second connecting plate 72B non-rotatably attached to the first connecting plate 72A coaxially with the rotational axis X, a substantially annular inertial member (or absorber mass) 74 rotatable relative to the first and second connecting plates 72A, 72B coaxially with the rotational axis X, and a plurality of circumferentially acting absorber elastic members 76 interposed between the first and second connecting plates 72A, 72B and the inertial member 74. The absorber elastic members 76 are elastically coupling the first and second connecting plates 72A, 72B to the inertial member 74. Each of the first and second connecting plates 72A, 72B is preferably made of as a single or unitary component. Preferably, each of the first and second connecting plates 72A, 72B is integrally press-formed from a single sheet-metal blank. Further according to the first exemplary embodiment of the present invention, each of the absorber elastic members 76 is in the form of helical (or coil) spring having a principal axis oriented substantially circumferentially about the rotational axis X.

Figure 3:
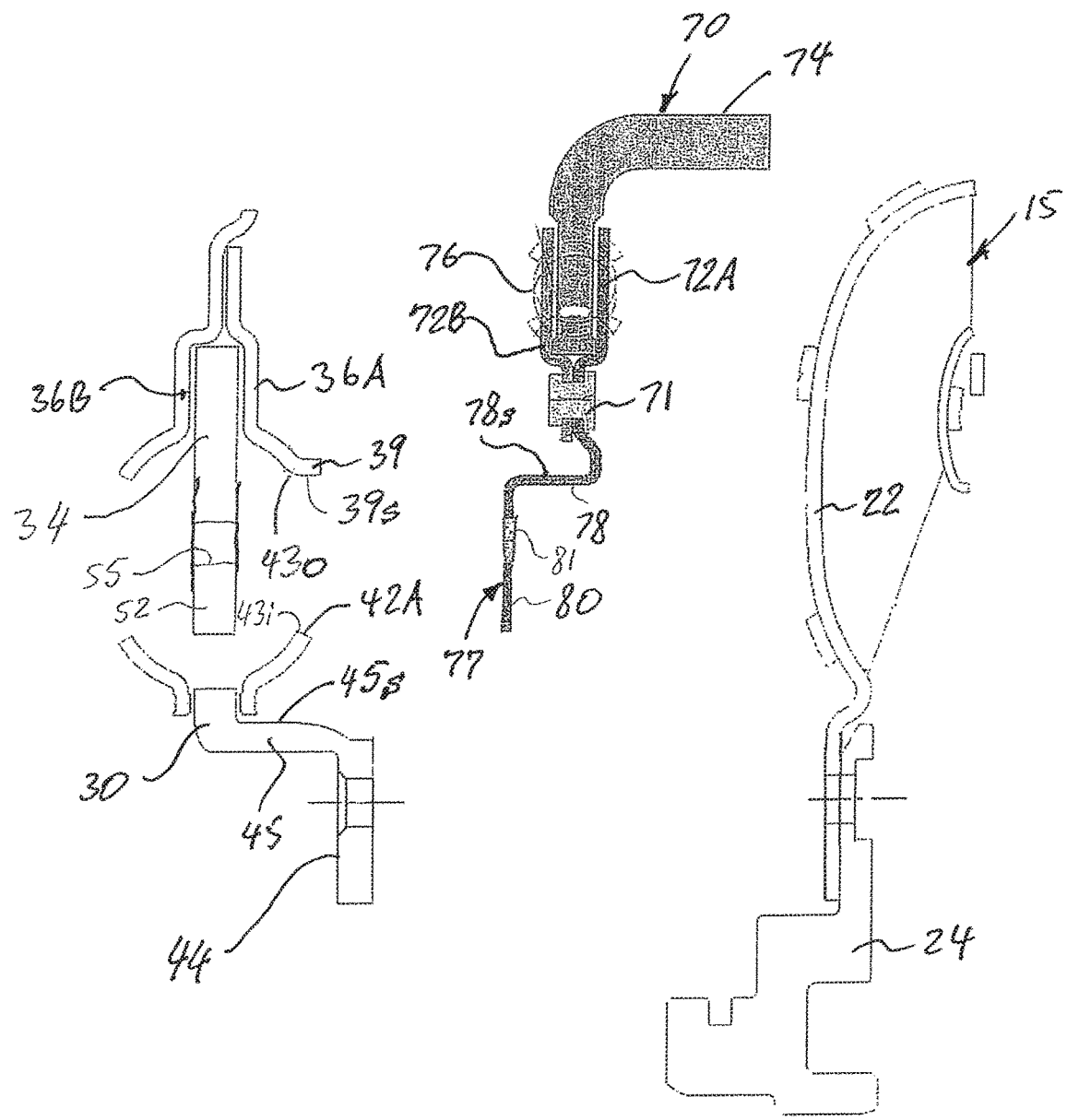
FIG. 3 is an exploded fragmentary cross-sectional half-view of the torsional vibration damper assembly of FIG. 2.
Figure 9:
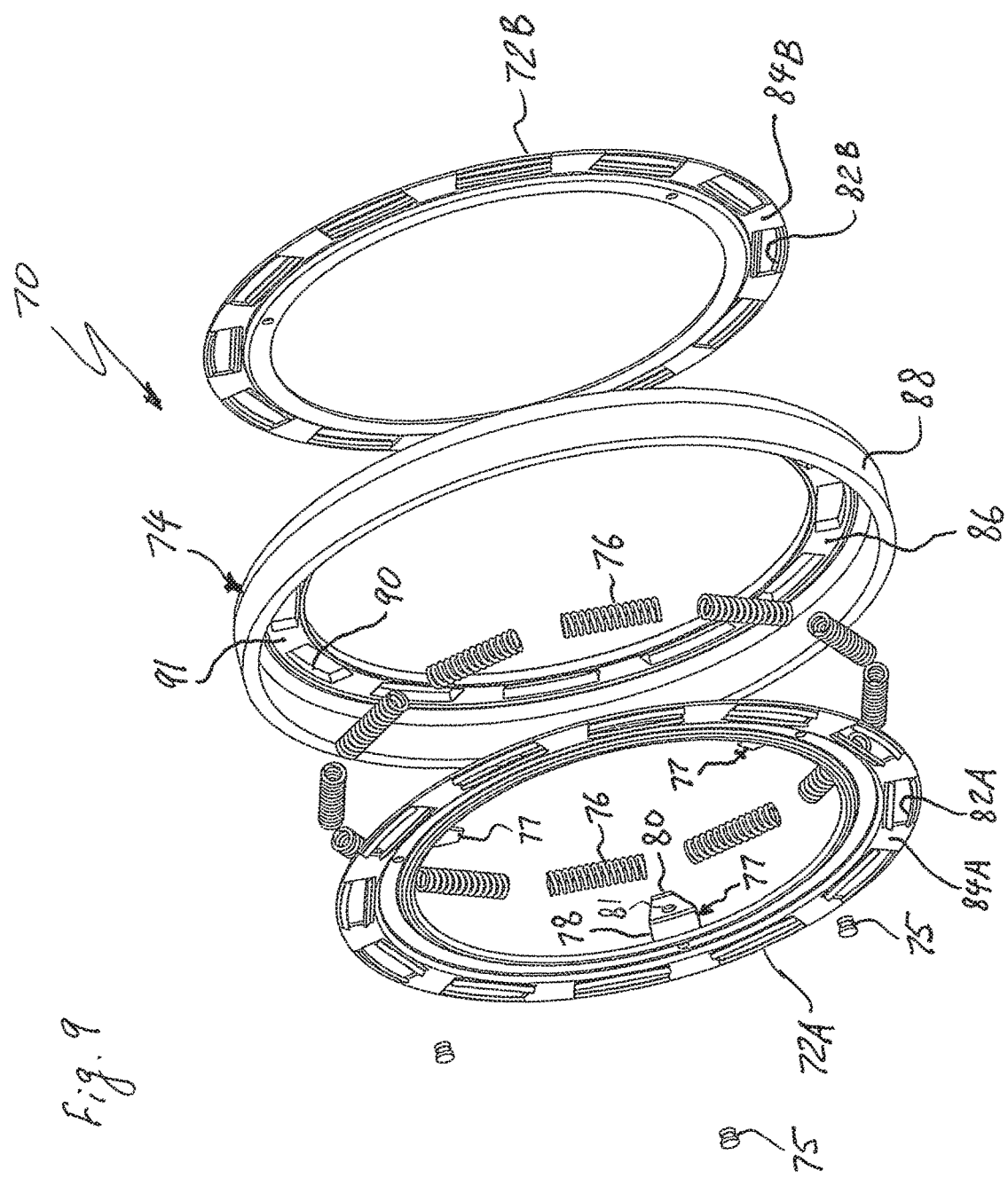
FIG. 9 is an exploded perspective view of a dynamic absorber of the torsional vibration damper assembly in accordance with the first exemplary embodiment of the present invention.

The first and second connecting plates 72A, 72B are non-rotatably attached to each other by any appropriate means, such as by fasteners 71 or welding. Further according to the present invention, the first connecting plate 72A has one or more guide legs 77 formed integrally with the rest of the first connecting plate 72A, as best shown in FIG. 3. According to the first exemplary embodiment of the present invention, as best shown in FIG. 9, the first connecting plate 72A has three guide legs 77. Each of the guide legs 77 includes an integral, substantially annular, for example cylindrical, guided portion 78 and a mounting portion 80 formed integral with the guided portion 78. According to the present invention, the guided portion 78 extends substantially axially, while the mounting portion 80 extends substantially radially inwardly and is disposed adjacent to the intermediate member 34. Moreover, the guided portion 78 has a circumferentially extending guided surface 78s facing and rotationally slidingly engaging the guiding surface 39s of the corresponding guiding flange 39 of the first retainer plate 36A of the torsional vibration damper 21 and define an axial contact surface between the guiding flange 39 of the first retainer plate 36A and the guided portion 78 of the first connecting plate 72A, as best shown in FIGS. 2, 3 and 4. In other words, the first connecting plate 72A of the dynamic absorber 70 is radially, rotationally guided outside the guided portion 78 of the first connecting plate 72A by the first retainer plate 36A of the torsional vibration damper 21.

Each of the first and second connecting plates 72A, 72B is provided with a plurality of circumferentially extending windows (or window-shaped openings) 82A, 82B, respectively, each of which is arranged in correspondence with one of the absorber elastic members 76, as best depicted in FIGS. 5A, 5B and 9. In other words, each of the windows 82A, 82B receives a single one of the absorber elastic members 76. Preferably, the windows 82A, 82B are press-formed in the first and second connecting plates 72A, 72B so as to be angularly equidistantly spaced from each other. The windows 82A, 82B are angularly equidistantly spaced from each other and are separated circumferentially from one another alternately by radial tabs 84A, 84B. Each of the first and second connecting plates 72A, 72B according to the first exemplary embodiment of the present invention has twelve windows 82A, 82B and twelve radial tabs 84A, 84B, as best shown in FIG. 9. Each of the radial tabs 84A, 84B is interposed circumferentially between two of the absorber elastic members 76 in series.

Figure 8:
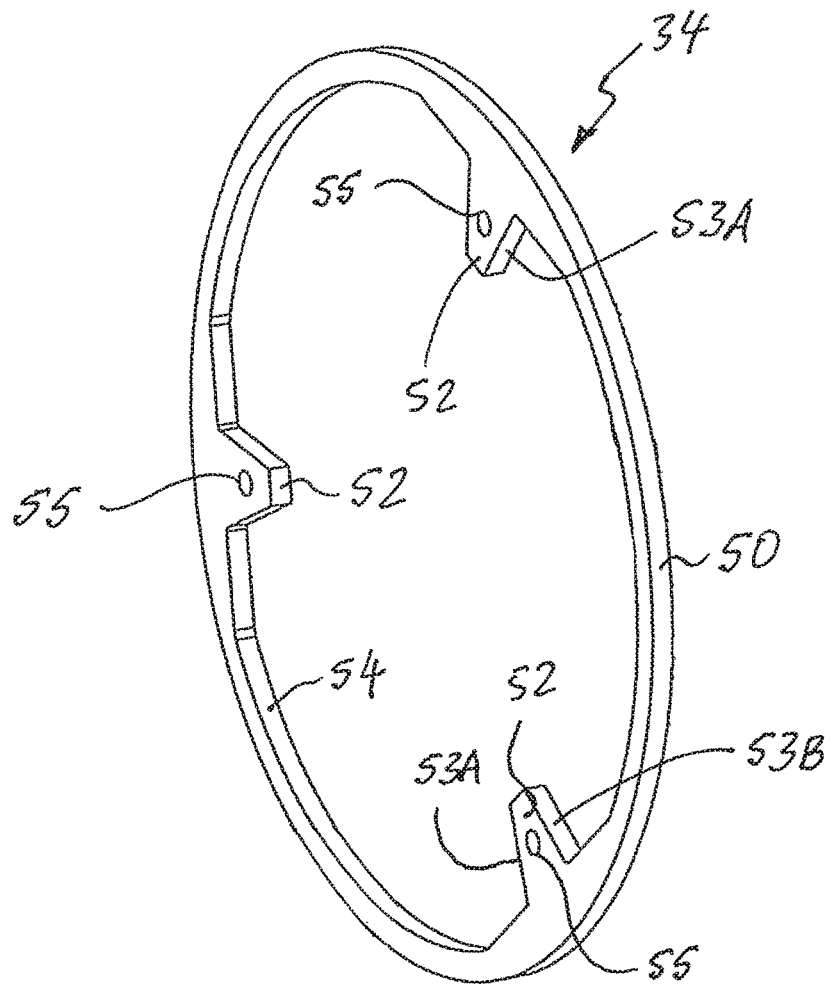
FIG. 8 is a perspective view of an intermediate plate of the torsional vibration damper in accordance with the first exemplary embodiment of the present invention.

Each of the mounting portions 80 of the first connecting plate 72A are non-movably (i.e., fixedly) attached to one of the internal radial lugs 52 of the intermediate member 34 of the torsional vibration damper 21 by appropriate means, such as by rivets 75 or welding. Accordingly, as best shown in FIGS. 2, 5A and 8, the rivets 75 axially extend through holes 55 through the internal radial lugs 52 of the intermediate member 34 and holes 81 through the mounting portion 80 of the first connecting plate 72A, best shown in FIGS. 2 and 8.

The inertial member 74 is a substantially annular heavy wheel (i.e., having a relatively large mass) for opposing and resisting by its inertia to any fluctuation in speed of the machinery, such as the hydrokinetic torque coupling device, with which it rotates. The inertial member 74 includes a substantially annular support (or connection) portion 86 and a substantially annular inertial portion 88 formed integrally with the support portion 86. The inertial member 74 with the support portion 86 and the inertial portion 88 is an integral part, e.g., made of a single-piece or unitary component, but may be separate components fixedly connected together. Preferably, the inertial member 74 is integrally made by stamping into an L-shape or by roll forming from a rolled strip. Moreover, the inertial portion 88 of the inertial member 74 has a thickness and a mass substantially larger than the thickness and mass of the support portion 86 thereof.

The support portion 86 of the inertial member 74 is elastically and rotatably coupled to the first and second connecting plates 72A, 72B through the absorber elastic members 76 interposed circumferentially between the first and second connecting plates 72A, 72B and the inertial member 74.

The support portion 86 of the inertial member 74 is provided with a plurality of circumferentially extending windows (or window-shaped openings) 90, each of which is arranged in correspondence with one of the absorber elastic members 76, as best depicted in FIGS. 5A, 5B and 9. In other words, each of the windows 90 receives a single one of the absorber elastic members 76. The windows 90 are angularly equidistantly spaced from each other and are separated circumferentially from one another alternately by radial tabs 91. The support portion 86 of the inertial member 74 according to the first exemplary embodiment of the present invention has twelve windows 90 and twelve radial tabs 91, as best shown in FIG. 9. Each of the radial tabs 91 is interposed circumferentially between two of the absorber elastic members 76 in series.

Figure 3A:
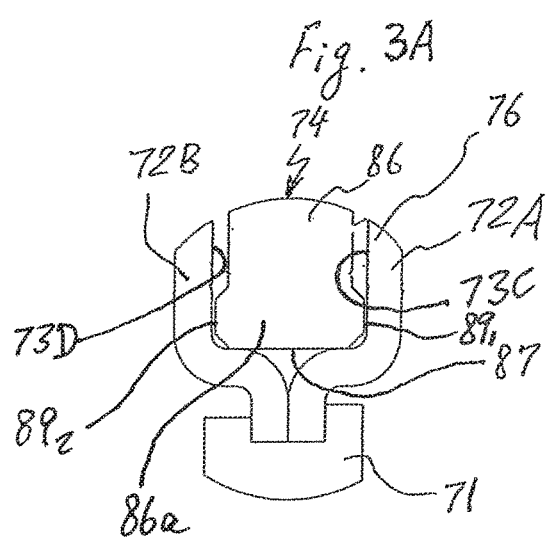
FIG. 3A is an enlarged view of a fragment of the torsional vibration damper assembly shown in the circle "3A" of FIG. 2.
Figure 3B:
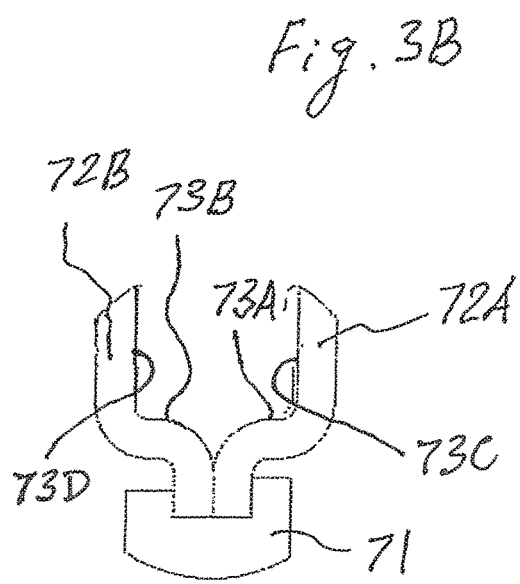
FIG. 3B is an enlarged view of a fragment of the torsional vibration damper assembly shown in the circle "3A" of FIG. 2 without an inertial member.

Moreover, the support portion 86 of the inertial member 74 has a substantially annular, for example cylindrical, radially inner peripheral surface 87 rotationally slidingly supported in the radial direction by substantially annular radial support surfaces 73A, 73B of the first and second connecting plates 72A, 72B, respectively, as best shown in FIGS. 2, 3A and 3B. In other words, the inertial member 74 is radially, rotationally guided and centered relative to the rotational axis X by the radial support surfaces 73A, 73B of the first and second connecting plates 72A, 72B.

Figure 10:
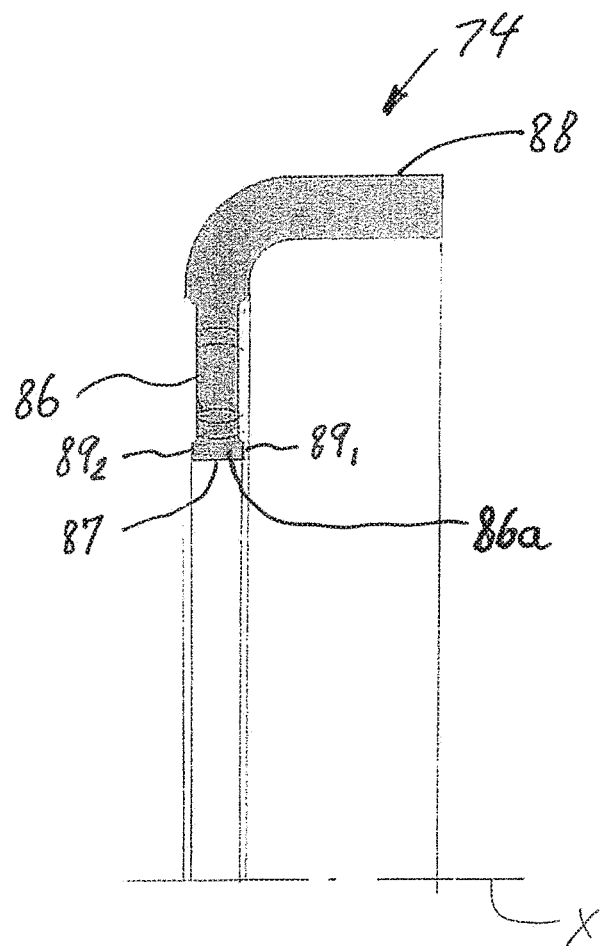
FIG. 10 is a cross-sectional half-view of an inertial member of the dynamic absorber in accordance with the first exemplary embodiment of the present invention.

Also, the support portion 86 of the inertial member 74 has an enlarged section 86a at a radially innermost end thereof. As best shown in FIG. 3A, the enlarged section 86a of the support portion 86 has axially opposite side surfaces 891 and 892 such that the side surface 891 is adjacent (or juxtaposed) to an inner radially extending side surface 73C of the first connecting plate 72A, while the side surface 892 is adjacent to an inner radially extending side surface 73D of the second connecting plate 72B (best shown in FIGS. 3A, 3B and 10). Thus, the first and second connecting plates 72A, 72B of the dynamic absorber 70 restrain the movement of the inertial member 74 in the axial direction.

During operation of the torsional vibration damper assembly 20, the power inputted into the first and second retainer plates 36A, 36B of the torsional vibration damper 21 is transmitted to the turbine hub 24 through the intermediate member 34, the damper elastic members 38 and the driven member 30. Specifically, the damper elastic members 38 are compressed between the external radial lugs 46 of the driven member 30 and the internal radial lugs 52 of the intermediate member 34 of the torsional vibration damper 21, in order to damp abrupt changes in torque. Therefore, variations in rotation of the engine can be effectively dampened. Moreover, the dynamic absorber 70 is operationally coupled to the intermediate member 34 through the absorber elastic members 76. Specifically, the inertial member 74 of the dynamic absorber 70 is elastically coupled through the absorber elastic members 76 to the first and second connecting plates 72A, 72B, which are non-rotatably connected to the intermediate member 34, thus the turbine hub 24. Also, when the rotational speed of an engine is reduced, variation in rotation of the engine caused by fluctuation in combustion is considerably increased. Subsequently, the inertial member 74 of the dynamic absorber 70 reduces fluctuation in rotational speed of the turbine wheel 15 as an output-side component at a relatively low engine rotational speed of the engine (such as about 1000-1400 rpm).

An exemplary method for assembling the hydrokinetic torque coupling device 10 according to the embodiment of FIGS. 1-10 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10-310 may be practiced by sequentially performing the steps as set forth below, it should be understood that the methods may involve performing the steps in different sequences The turbine wheel 15, the impeller wheel 16, the stator 17, the torsional vibration damper 21 and the dynamic absorber 70 may each be preassembled. The turbine wheel 15, the impeller wheel 16, and the stator 17 are assembled together so as to form the torque converter 14. Next, the first connecting plate 72A is non-rotatably mounted to the internal radial lugs 52 of the intermediate member 34 of the torsional vibration damper 21 by any appropriate means, such as by the rivets 75 or welding. Then, the turbine shell 22 of the turbine wheel 15 is non-movably (i.e., fixedly) secured to both the turbine hub 24 and the driven member 30 by any appropriate means, such as by the rivets 23 or welding. Next, the locking piston 28 is slidably mounted to the turbine hub 24. After that, the torque converter 14 with the torsional vibration damper 21 and the dynamic absorber 70 are sealed in the casing 12.

Various modifications, changes, and alterations may be practiced with the above-described embodiment, including but not limited to the additional embodiments shown in FIGS. 11-30. In the interest of brevity, reference characters in FIGS. 11-30 that are discussed above in connection with Figs. FIGS. 1-10 are not further elaborated upon below, except to the extent necessary or useful to explain the additional embodiments of FIGS. 11-30. Modified components and parts are indicated by the addition of a hundred digits to the reference numerals of the components or parts.

In a hydrokinetic torque coupling device 110 of a second exemplary embodiment illustrated in FIGS. 11-18, the torsional vibration damper assembly 20 is replaced by a torsional vibration damper assembly 120. The hydrokinetic torque coupling device 110 of FIGS. 11-18 corresponds substantially to the hydrokinetic torque coupling device 10 of FIGS. 1-10, and only the portions of the torsional vibration damper assembly 120, which differ, will therefore be explained in detail below. In the second exemplary embodiment of the present invention illustrated in FIGS. 11-18, the torsional vibration damper assembly 120 includes a torsional vibration damper 121 operatively coupled to the turbine wheel 15 and the turbine hub 24 of the torque converter 14, and a dynamic absorber 170 operatively connected to the torsional vibration damper 121.

Figure 16:
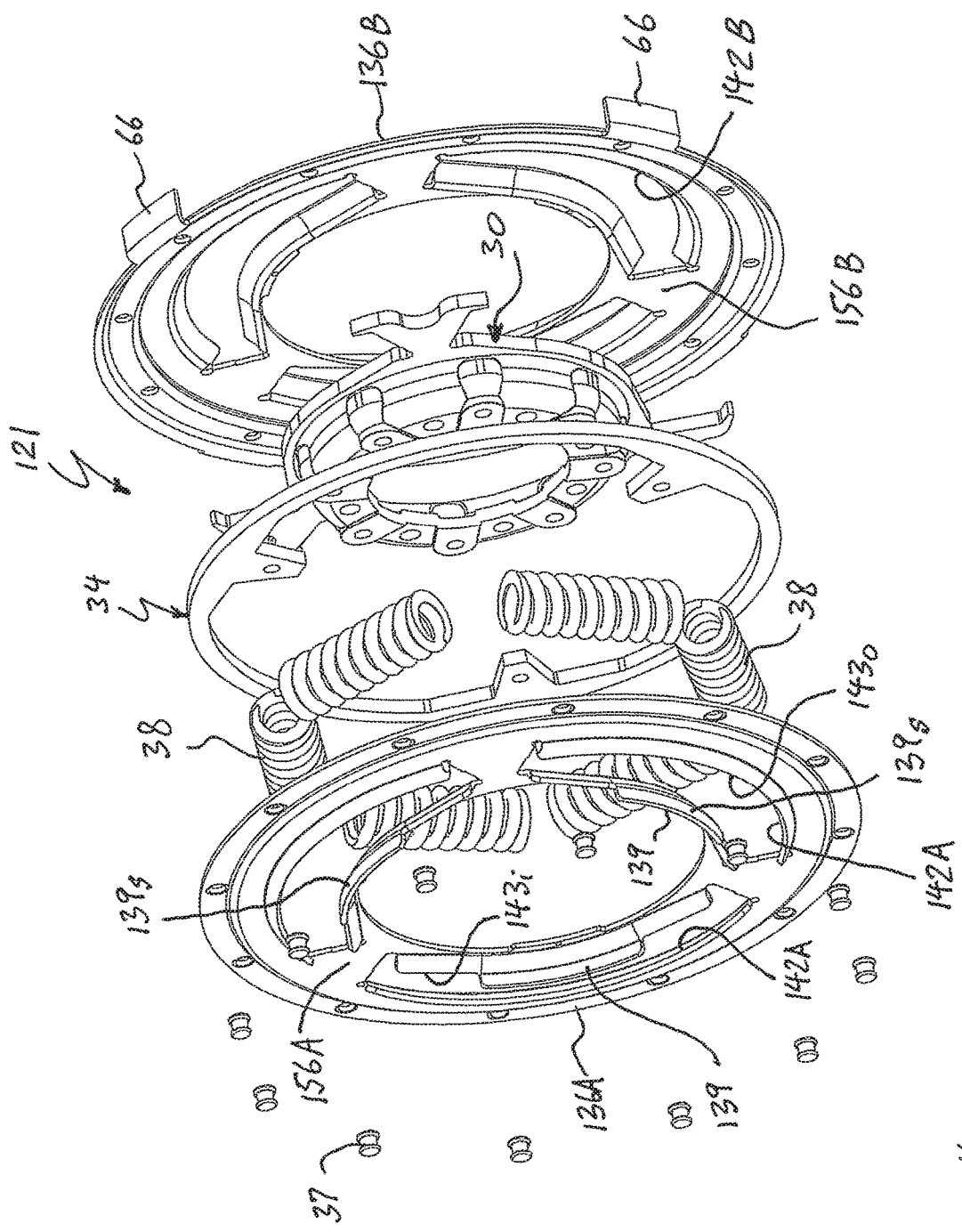
FIG. 16 is an exploded perspective view of a torsional vibration damper of the torsional vibration damper assembly in accordance with the second exemplary embodiment of the present invention.

As best shown in FIGS. 11, 12 and 16, the torsional vibration damper 121 comprises a substantially annular driven member 30 fixedly (i.e., non-movably) secured to the turbine hub 24, and a substantially annular intermediate member 34 mounted about the driven member 30 and rotatably moveable relative thereto. The driven member 30 has an integrally formed and radially inwardly extending flange 32. The flange 32 of the driven member 30 is fixedly (i.e., non-movably) secured to the turbine hub 24 by any appropriate means, such as by the rivets 23 or welding. The driven member 30 constitutes an output member of the torsional vibration damper 121.

The torsional vibration damper 121 further comprises a substantially annular first retainer plate 136A and a substantially annular second retainer plate 136B, and a plurality of circumferentially acting damper elastic members (or torque transmitting elements) 38 disposed in series relative to each other between the driven member 30 and the first and second retainer plates 136A, 136B, as best shown in FIG. 11. The first and second retainer plates 136A, 136B are mounted adjacent to axially opposite sides (surfaces) of the driven member 30 and the intermediate member 34 so as to be oriented parallel to each other and coaxially with the rotational axis X. The first and second retainer plates 136A, 136B are non-movably (i.e., fixedly) secured to one another by any appropriate means, such as by fasteners or welding so as to rotatable relative to the driven member 30. Thus, the first and second damper retainer plates 136A, 136B are non-rotatable relative to one another, but rotatable relative to the driven member 30 and the intermediate member 34. Each of the damper elastic members 38 is disposed circumferentially between the driven member 30 and the first and second damper retainer plates 136A, 136B.

Moreover, according to the present invention, the first retainer plate 136A is provided with one or more circumferentially extending guiding flanges 139 extending axially outwardly from the first retainer plate 136A toward the turbine shell 22. Each of the one or more guiding flanges 139 has a circumferentially extending guiding surface 139s facing a radially outer edge 143o of each of windows 142A disposed radially opposite to a radially inner edge 143i thereof.

According to the second exemplary embodiment of the present invention, the radially inner edge 143i of each of the windows 142A through the first retainer plate 136A is provided with the circumferentially extending guiding flange 139 extending axially outwardly from the first retainer plate 136A toward the turbine shell 22. Each of the guiding flanges 139 is in the form of an annular segment and has a circumferentially extending guiding surface 139s facing the radially outer edge 143o of each of the windows 142A disposed radially opposite to the radially inner edge 143i thereof. In non-limiting fashion, each of the circumferentially extending guiding surfaces 139s is in the form of a surface of revolution, such as a substantially curvilinear or cylindrical surface. According to the second exemplary embodiment of the present invention, as best shown in FIG. 16, the first retainer plate 136A has three guiding flanges 139.

Further according to the second exemplary embodiment of the present invention, as best shown in FIG. 16, each of the first and second damper retainer plates 136A, 136B is preferably a stamped member of suitable metallic construction being an integral part, e.g., made of a single or unitary component, but may be separate components fixedly connected together. Preferably, the circumferentially extending guiding flange 139 is integrally press-formed on the first retainer plate 136A so as to be equiangularly spaced from each other.

The dynamic absorber 170 of the torsional vibration damper assembly 120 is operatively connected to the intermediate member 34 of the torsional vibration damper 121. The dynamic absorber 170 is rotationally guided and radially centered relative to the rotational axis X by rotationally slidingly engaging the first retainer plate 136A of the torsional vibration damper 121, as best shown in FIGS. 11 and 12. The dynamic absorber 170 functions as a dynamic damper for further dampening the torsional vibration (variation in speed of rotation) transmitted to the driven member 30 of the torsional vibration damper 121.

The dynamic absorber 170 includes a substantially annular first connecting plate 172A non-rotatably attached to the first intermediate member 34 coaxially with the rotational axis X, a substantially annular second connecting plate 172B non-rotatably attached to the first connecting plate 172A coaxially with the rotational axis X, a substantially annular inertial member 174 rotatable relative to the first and second connecting plates 172A, 172B coaxially with the rotational axis X, and a plurality of circumferentially acting absorber elastic members 76 interposed between the first and second connecting plates 172A, 172B and the inertial member 174. The absorber elastic members 76 elastically couple the first and second connecting plates 172A, 172B to the inertial member 174. Each of the first and second connecting plates 172A, 172B is preferably made as a single or unitary component. Preferably, each of the first and second connecting plates 172A, 172B is integrally press-formed from a single sheet-metal blank.

Figure 17:
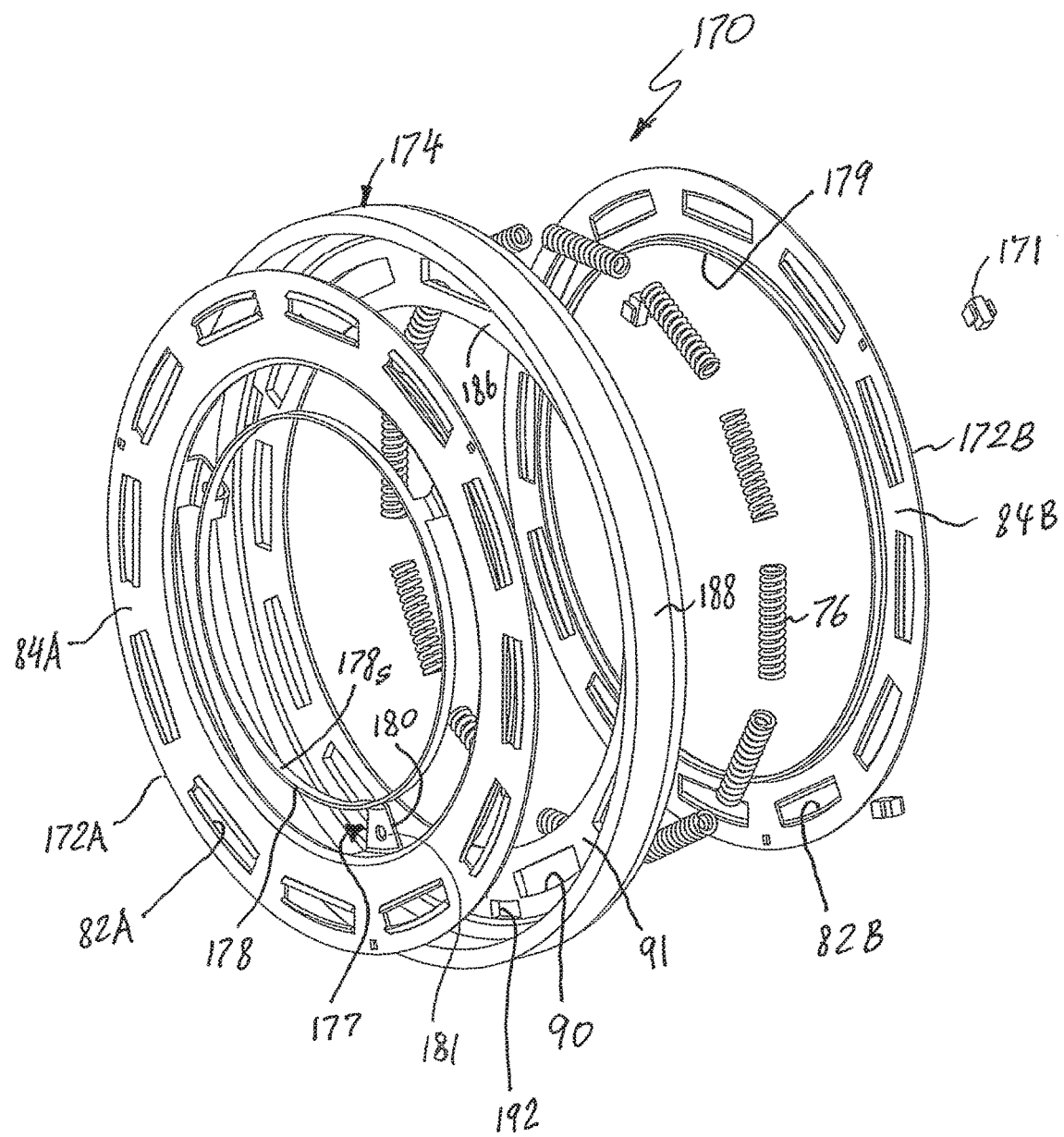
FIG. 17 is an exploded perspective view of a dynamic absorber of the torsional vibration damper assembly in accordance with the second exemplary embodiment of the present invention.

Further according to the present invention, the first connecting plate 172A has an integral, substantially annular, for example cylindrical, guided portion 178 and one or more mounting portions 180 each formed integral with the guided portion 178 and the first connecting plate 172A. According to the present invention, the guided portion 178 extends substantially axially, while each of the mounting portions 180 extends substantially radially inwardly and is disposed adjacent to the intermediate member 34. Moreover, the guided portion 178 has a circumferentially extending guided surface 178s facing and rotationally slidingly engaging the guiding surface 139s of the guiding flanges 139 of the first retainer plate 136A of the torsional vibration damper 121. According to the second exemplary embodiment of the present invention, the first connecting plate 172A has a single guided portion 178 and three mounting portions 180 integrally connecting the guided portion 178, as best shown in FIG. 17. In other words, the first connecting plate 172A of the dynamic absorber 170 is radially, rotationally guided inside by the first retainer plate 136A of the torsional vibration damper 121.

Figure 15:
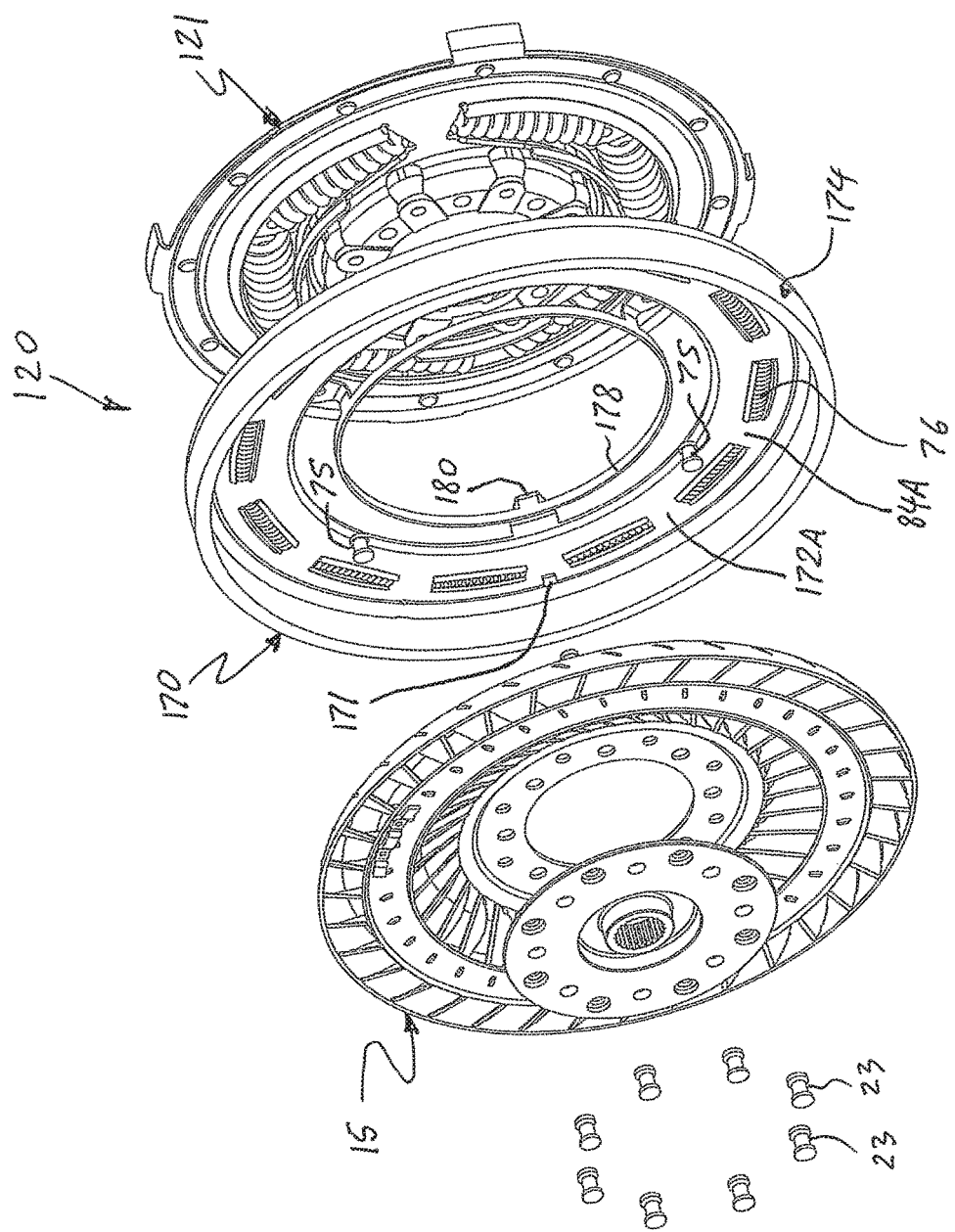
FIG. 15 is a front partial exploded assembly view of the torsional vibration damper assembly in accordance with the second exemplary embodiment of the present invention.

Each of the first and second connecting plates 172A, 172B is provided with a plurality of circumferentially extending windows (or window-shaped openings) 82A, 82B, respectively, each of which is arranged in correspondence with one of the absorber elastic members 76, as best depicted in FIGS. 15 and 17. In other words, each of the windows 82A, 82B receives a single one of the absorber elastic members 76. Preferably, the windows 82A, 82B are press-formed in the first and second connecting plates 172A, 172B so as to be angularly equidistantly spaced from each other. The windows 82A, 82B are angularly equidistantly spaced from each other and are separated circumferentially from one another alternately by radial tabs 84A, 84B. Each of the first and second connecting plates 172A, 172B according to the second exemplary embodiment of the present invention has twelve windows 82A, 82B and twelve radial tabs 84A, 84B, as best shown in FIG. 17. Each of the radial tabs 84A, 84B is interposed circumferentially between two of the absorber elastic members 76 in series.

Each of the mounting portions 180 of the first connecting plate 172A are non-movably (i.e., fixedly) attached to one of the internal radial lugs 52 of the intermediate member 34 of the torsional vibration damper 121 by any appropriate means, such as by rivets 75 or welding. Accordingly, as best shown in FIG. 12, the rivets 75 axially extend through holes 55 through the internal radial lugs 52 of the intermediate member 34 and holes 181 through the mounting portion 180 of the first connecting plate 172A, best shown in FIGS. 12 and 15.

The inertial member 174 is a substantially annular heavy wheel (i.e., having a relatively large mass) for opposing and resisting by its inertia to any fluctuations in speed of the machinery, such as the hydrokinetic torque coupling device, with which it rotates. The inertial member 174 includes a substantially annular support (or connection) portion 186 and a substantially annular inertial portion 188 formed integrally with the support portion 186. The inertial member 174 with the support portion 186 and the inertial portion 188 is an integral part, e.g., made of a single-piece or unitary component, but may be separate components fixedly connected together. Preferably, the inertial member 174 is integrally made by stamping in an L-shape or by rolled forming from a rolled strip. Moreover, the inertial portion 188 of the inertial member 174 has a thickness and a mass substantially bigger than a thickness and a mass of the support portion 186 thereof.

The support portion 186 of the inertial member 174 is elastically and rotatably coupled to the first and second connecting plates 172A, 172B through the absorber elastic members 76 interposed circumferentially between the first and second connecting plates 172A, 172B and the inertial member 174.

The support portion 186 of the inertial member 174 is provided with a plurality of circumferentially extending windows (or window-shaped openings) 90, each of which is arranged in correspondence with one of the absorber elastic members 76, as best depicted in FIG. 17. In other words, each of the windows 90 receives a single one of the absorber elastic members 76. The windows 90 are angularly equidistantly spaced from each other and are separated circumferentially from one another alternately by radial tabs 91. The support portion 186 of the inertial member 174 according to the second exemplary embodiment of the present invention has twelve windows 90 and twelve radial tabs 91, as best shown in FIG. 17. Each of the radial tabs 91 is interposed circumferentially between two of the absorber elastic members 76 in series.

Figure 18:
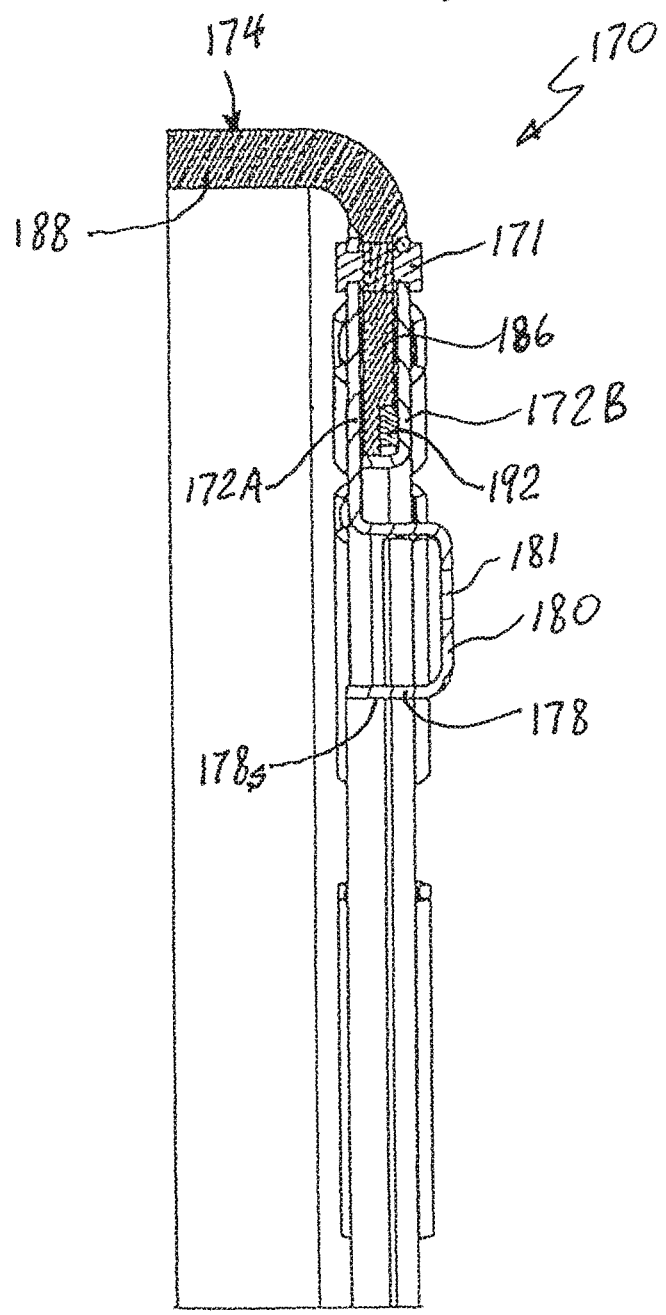
FIG. 18 is a cross-sectional half-view of the dynamic absorber in accordance with the second exemplary embodiment of the present invention.

The first and second connecting plates 172A, 172B are non-rotatably attached to each other by appropriate means, such as by fasteners 171 or welding. As illustrated in FIG. 17, the support portion 186 of the inertial member 174 is provided with a plurality of circumferentially extending window-shaped openings 191, each of which is arranged in correspondence with one of the fasteners 171, as best depicted in FIGS. 15, 17 and 18. The fasteners 171 axially extend through the window-shaped openings 191 in the support portion 186 of the inertial member 174 so as to allow the support portion 186 of the inertial member 174 a certain degree of (i.e., limited) rotation relative to the first and second connecting plates 172A, 172B.

Moreover, the second connecting plate 172B of the inertial member 174 has a substantially annular support flange 179 extending substantially axially toward the first connecting plate 172A. As best shown in FIGS. 12 and 13, a substantially annular, for example cylindrical, inner peripheral surface 187 of the support portion 186 of the inertial member 174 is rotationally slidingly supported in the radial direction by substantially annular support surfaces 179s of the support flange 179 of the second connecting plate 172B, as best shown in FIGS. 12 and 13. In other words, the inertial member 174 is radially, rotationally guided and centered relative to the rotational axis X by the support surface 179 of the second connecting plate 172B, which defines an inner diameter of the second connecting plate 172B.

Furthermore, the support portion 186 of the inertial member 174 has a stepped surface 192 recessed into one of axially outer surfaces of the support portion 186, which faces the second connecting plate 172B and axially spaced from the second connecting plate 172B.

The dynamic absorber 170 further comprises an anti-friction washer 195 (best shown in FIGS. 12, 13 and 18) disposed axially between the stepped surface 192 of the support portion 186 of the inertial member 174 and the second connecting plate 172B. The anti-friction washer 195 is configured to reduce friction between the support portion 186 of the inertial member 174 and the second connecting plate 172B during the relative rotational movement between the inertial member 174 and second connecting plate 172B. According to the second exemplary embodiment of the present invention, the anti-friction washer 195 is made of a low hysteresis and/or low friction material, such as hard plastic including thermoplastic polymer material.

Figure 19:
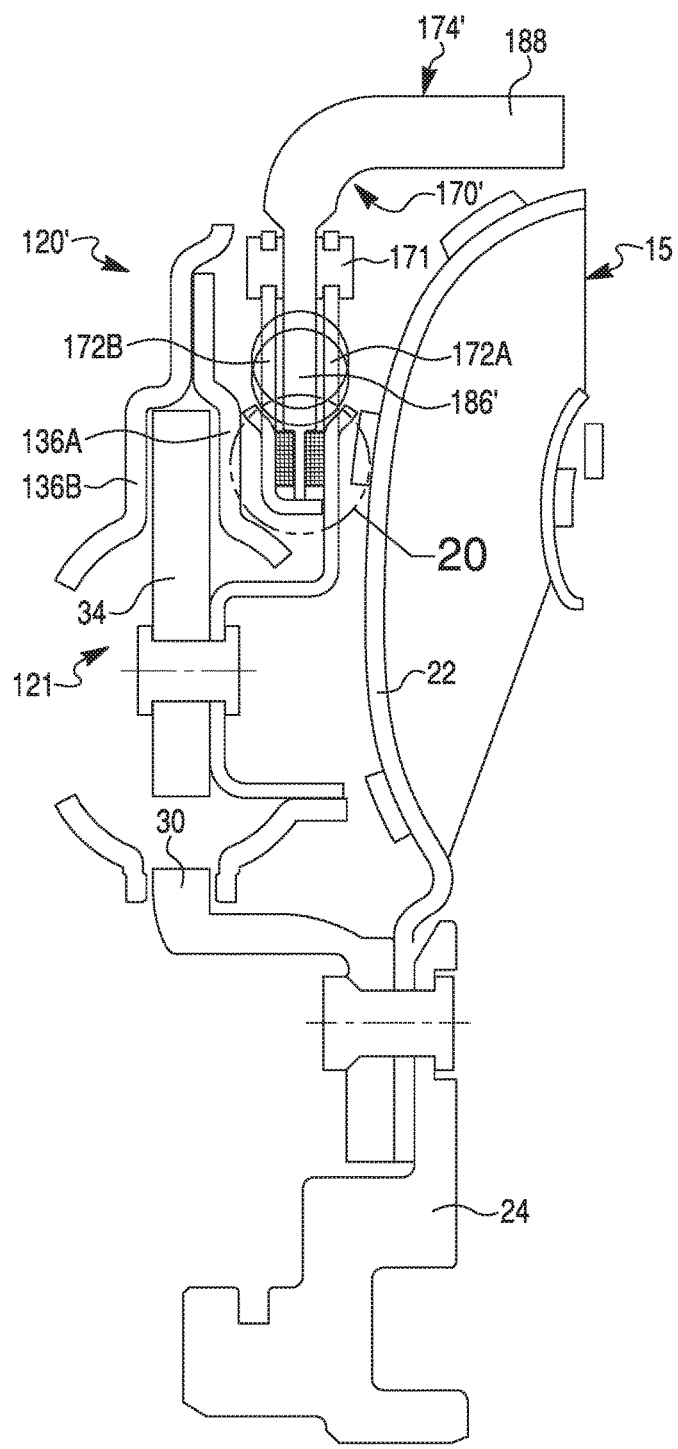
FIG. 19 is a fragmentary cross-sectional half-view of a torsional vibration damper assembly the hydrokinetic torque coupling device in accordance with an alternative to the second exemplary embodiment of the present invention.
Figure 20:
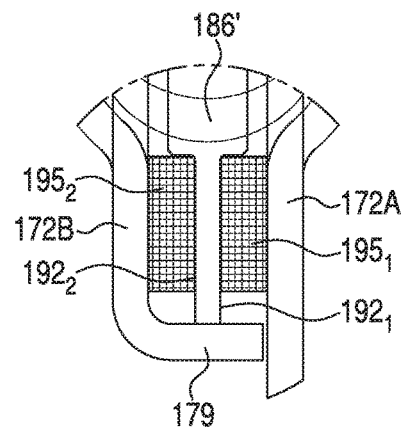
FIG. 20 is an enlarged view of a fragment of the torsional vibration damper assembly shown in the circle "20" of FIG. 19.
Figure 24:
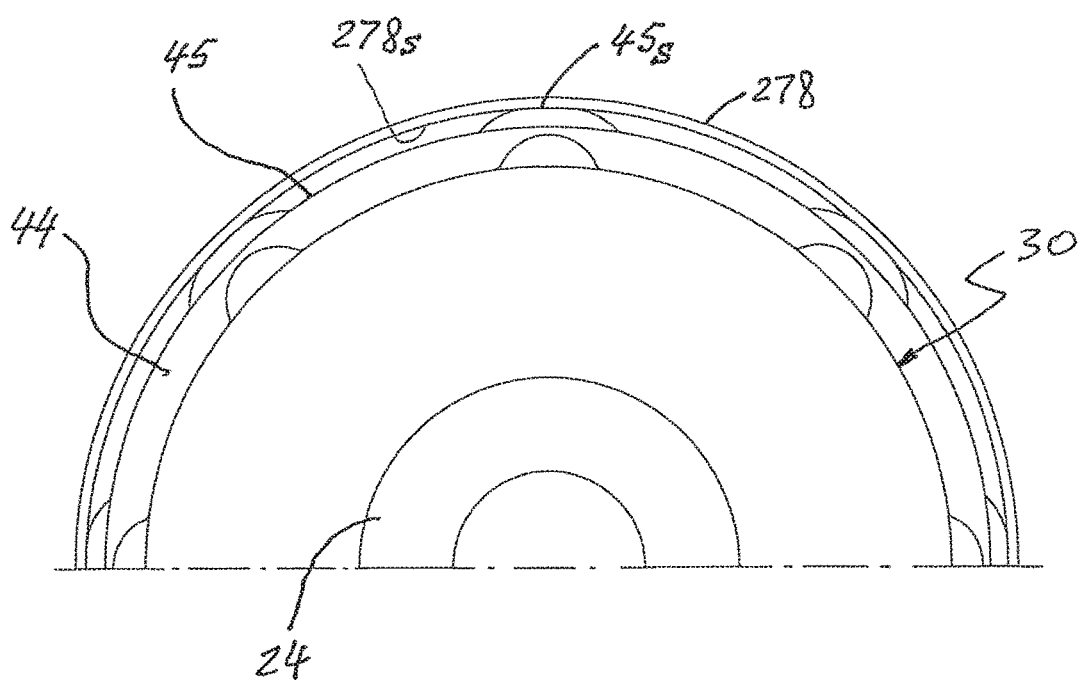
FIG. 24 is a partial elevational front view of the torsional vibration damper assembly taken along the line 24-24 in FIG. 23.
Figure 25:
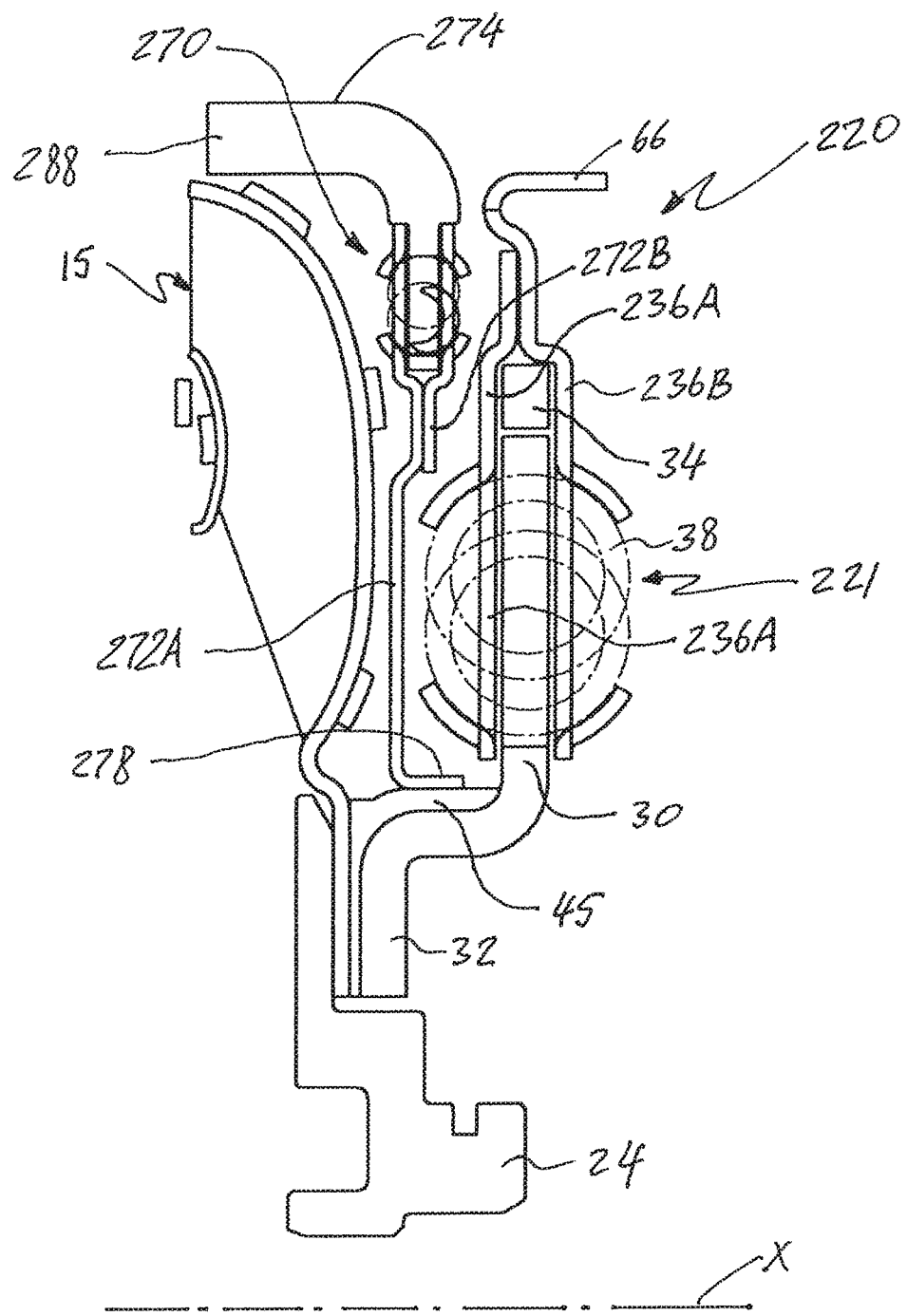
FIG. 25 is a fragmented half-view in axial section not though one of the mounting portions of the dynamic absorber of the hydrokinetic torque coupling device in accordance with the third exemplary embodiment of the present invention.
Figure 26:
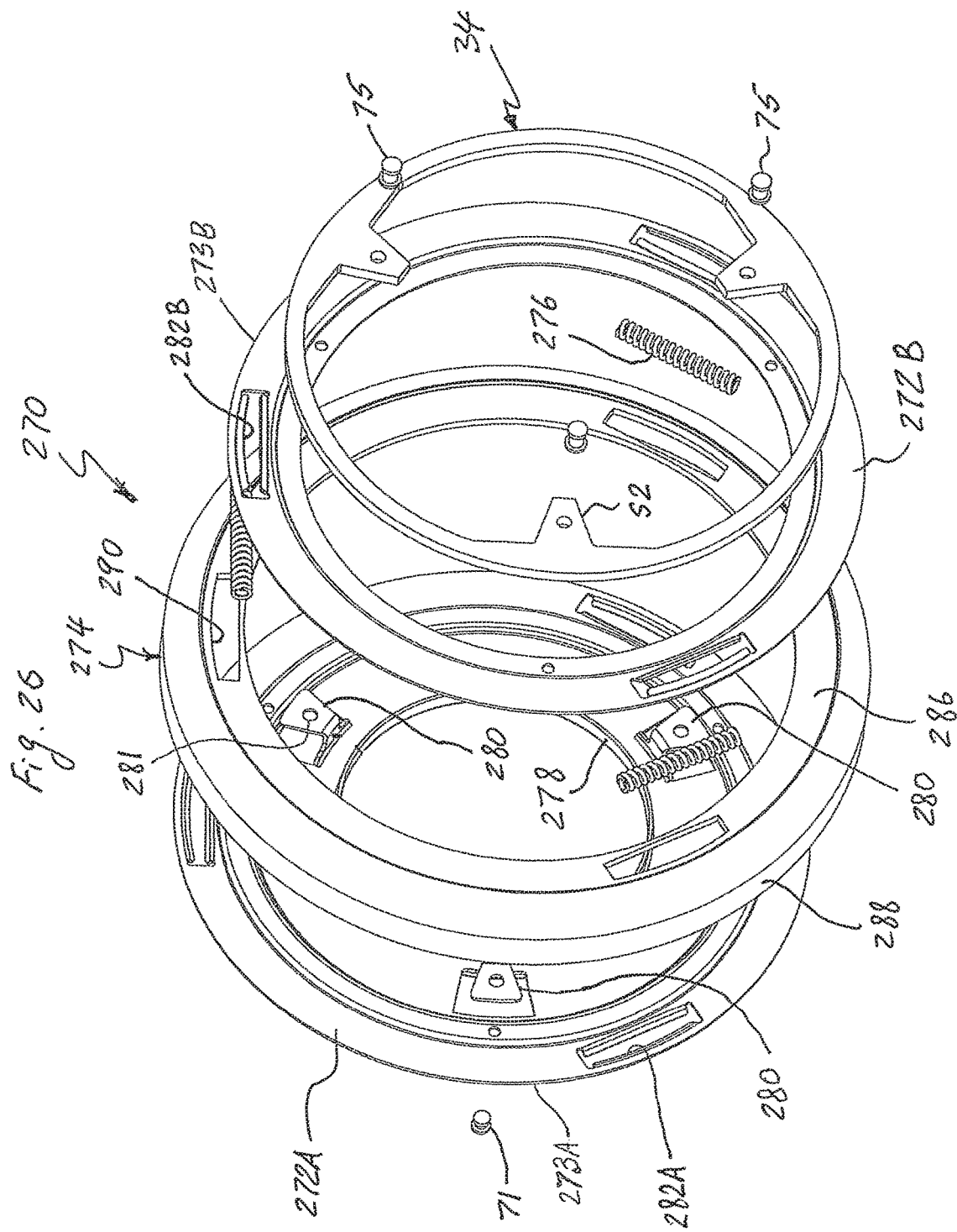
FIG. 26 is a front partial exploded assembly view of the dynamic absorber of the torsional vibration damper assembly in accordance with the third exemplary embodiment of the present invention.
Figure 27:
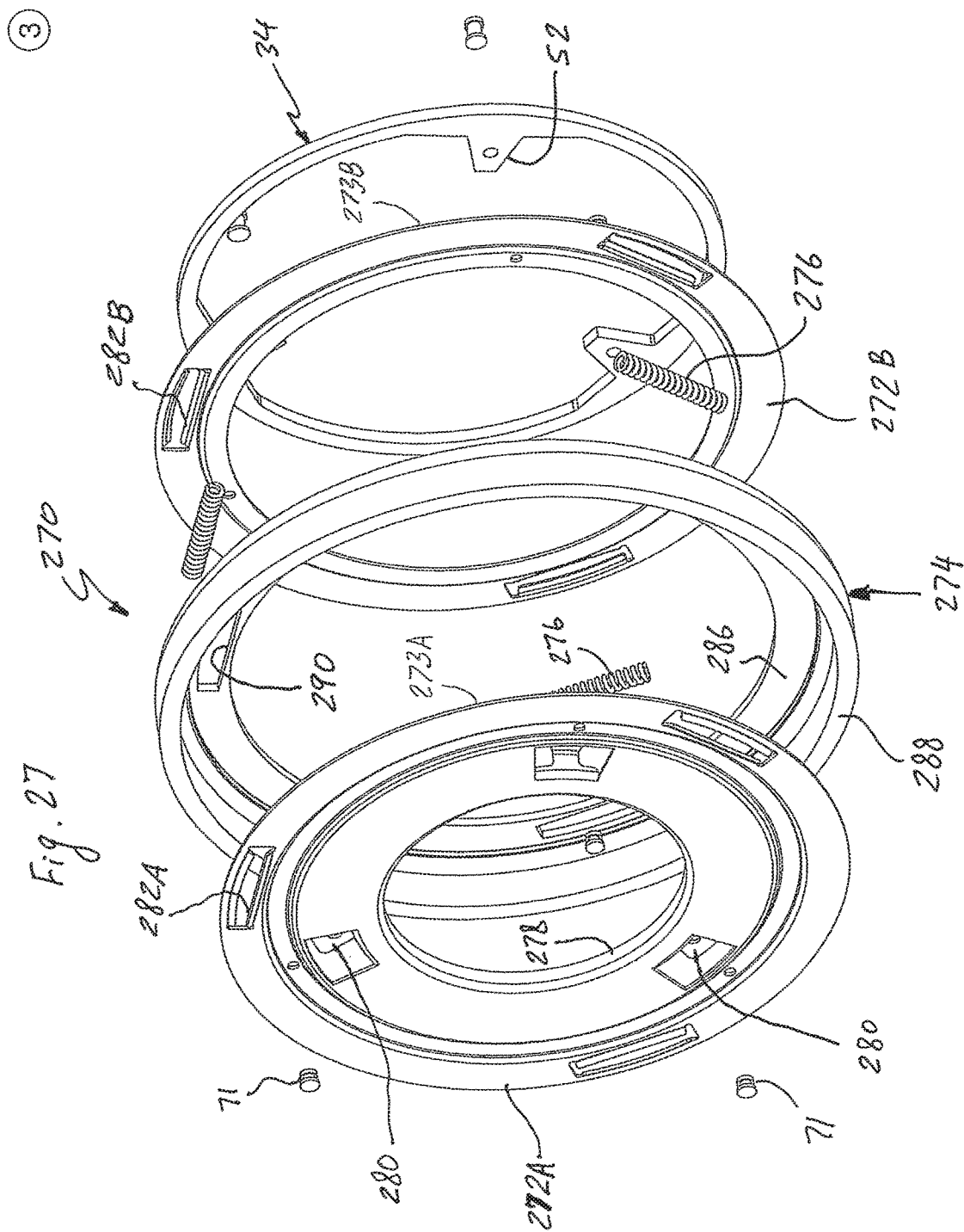
FIG. 27 is a rear partial exploded assembly view of the dynamic absorber of the torsional vibration damper assembly in accordance with the third exemplary embodiment of the present invention.

Alternatively, as illustrated in FIGS. 19 and 20, a dynamic absorber 170' comprises a support portion 186' of an inertial member 174' having a pair of first and second stepped surfaces $192_1$ and $192_2$, respectively, recessed into each of axially opposite outer surfaces of the support portion 186' so that the first stepped surface $192_1$ faces the first connecting plate 172A and is axially spaced from the first connecting plate 172A, and the second stepped surface $192_2$ faces the second connecting plate 172B and is axially spaced from the second connecting plate 172B. Moreover, the dynamic absorber 170' further comprises a pair of first and second anti-friction washers $195_1$ and $195_2$. Specifically, the first anti-friction washer $195_1$ is disposed axially between the first stepped surface $192_1$ and the first connecting plate 172A, while the second anti-friction washer $195_2$ is disposed axially between the second stepped surface $192_2$ and the second connecting plate 172B. The anti-friction washers $195_1$ and $195_2$ are configured to reduce friction between the support portion 186' of the inertial member 174' and the first and second connecting plates 172A, 172B during the relative rotational movement between the inertial member 174' and the first and second connecting plates 172A, 172B. Preferably, the anti-friction washers $195_1$ and $195_2$ are made of a low hysteresis material, such as plastic.

In a hydrokinetic torque coupling device 210 of a third exemplary embodiment illustrated in FIGS. 21-27, the torsional vibration damper assembly 20 is replaced by a torsional vibration damper assembly 220. The hydrokinetic torque coupling device 210 of FIGS. 21-27 corresponds substantially to the hydrokinetic torque coupling device 10 of FIGS. 1-10, and only the portions of the torsional vibration damper assembly 220, which differ, will therefore be explained in detail below. In the third exemplary embodiment of the present invention illustrated in FIGS. 21-27, the torsional vibration damper assembly 220 includes a torsional vibration damper 221 operatively coupled to the turbine wheel 15 and the turbine hub 24 of the torque converter 14, and a dynamic absorber 270 operatively connected to the torsional vibration damper 221.

The torsional vibration damper 221 comprises a substantially annular driven member 30 fixedly (i.e., non-movably) secured to the turbine hub 24, and a substantially annular intermediate member 34 mounted about the driven member 30 and rotatably moveable relative thereto, as best shown in FIGS. 11, 12 and 16. The driven member 30 has an integrally formed and radially inwardly extending flange 32. The flange 32 of the driven member 30 is fixedly (i.e., non-movably) secured to the turbine hub 24 by any appropriate means, such as by the rivets 23 or welding. The driven member 30 constitutes an output member of the torsional vibration damper 221. Also, the central portion 44 of the driven member 30 has a guiding flange 45 extending both circumferentially and axially from the external radial lugs 46 of the driven member 30, as best shown in FIG. 7. The guiding flange 45 of the driven member 30 has a circumferentially extending guiding surface 45s facing the first retainer plate 236A and the dynamic absorber 270.

The dynamic absorber 270 includes a substantially annular first connecting plate 272A non-rotatably attached to the intermediate member 34 coaxially with the rotational axis X, a substantially annular second connecting plate 272B non-rotatably attached to the first connecting plate 272A coaxially with the rotational axis X, a substantially annular inertial member (or absorber mass) 274 rotatable relative to the first and second connecting plates 272A, 272B coaxially with the rotational axis X, and a plurality of circumferentially acting absorber elastic members 276 interposed between the first and second connecting plates 272A, 272B and the inertial member 274. The absorber elastic members 276 elastically couple the first and second connecting plates 272A, 272B to the inertial member 274. Each of the first and second connecting plates 272A, 272B is preferably made as a single or unitary component. Preferably, each of the first and second connecting plates 272A, 272B is integrally press-formed from a single sheet-metal blank. The first and second connecting plates 272A, 272B are non-rotatably attached to each other by any appropriate means, such as by fasteners 71 or welding. Further according to the third exemplary embodiment of the present invention, each of the absorber elastic members 276 is in the form of helical (or coil) spring having a principal axis oriented substantially circumferentially.

As illustrated in FIGS. 21, 22, 26 and 27, each of the first and second connecting plates 272A, 272B has a substantially annular, for example cylindrical, radially outer peripheral (or radial support) surface 273A, 273B, respectively, defining an outer diameter of each of the first and second connecting plates 272A, 272B. Also, the inertial portion 288 of the inertial member 274 has a thickness and a mass substantially larger than the thickness and mass of the support portion 286 thereof. Accordingly, the inertial portion 288 of the inertial member 274 has substantially annular, for example cylindrical, inner peripheral surfaces $287_1$ and $287_2$ located adjacent to axially opposite sides of the support portion 286 thereof. Moreover, the radially inner peripheral surface $287_1$, $287_2$ of the inertial member 274 are rotationally slidingly supported in the radial direction by the radial support surfaces 273A, 273B of the first and second connecting plates 272A, 272B, respectively, as best shown in FIGS. 21 and 22. In other words, the inertial member 274 is radially, rotationally guided and centered relative to the rotational axis X by the radial support surfaces 273A, 273B of the first and second connecting plates 272A, 272B.

Further according to the third exemplary embodiment of the present invention, the first connecting plate 272A has an integral, substantially annular, for example cylindrical, guided portion 278 and one or more mounting portions 280 each formed integral with the first connecting plate 272A. According to the present invention, the guided portion 278 extends substantially axially, while each of the mounting portions 280 extends substantially radially outwardly and is disposed adjacent to the intermediate member 34. Moreover, the guided portion 278 has a circumferentially extending guided surface 278s facing and rotationally slidingly engaging the guiding surface 45s of the guiding flange 45 of the driven member 30 of the torsional vibration damper 221 and define an axial contact surface between the guiding flange 45 of the driven member 30 and the guided portion 178 of the first connecting plate 172A, as best shown in FIGS. 21 and 23). In other words, the first connecting plate 272A of the dynamic absorber 270 is radially, rotationally guided and centered relative to the rotational axis X inside by the guiding flange 45 of the driven member 30 of the torsional vibration damper 221. According to the third exemplary embodiment of the present invention, the first connecting plate 272A has a single guided portion 278 and three mounting portions 280 integral with the first connecting plate 272A, as best shown in FIG. 17. Preferably, the first and second connecting plate 272A is integrally press-formed from a single sheet-metal blank.

In a hydrokinetic torque coupling device 310 of a fourth exemplary embodiment illustrated in FIGS. 28-30, the torsional vibration damper assembly 20 is replaced by a torsional vibration damper assembly 220. The hydrokinetic torque coupling device 210 of FIGS. 28-30 corresponds substantially to the hydrokinetic torque coupling device 10 of FIGS. 1-10, and only the portions of the torsional vibration damper assembly 320, which differ, will therefore be explained in detail below. In the fourth exemplary embodiment of the present invention illustrated in FIGS. 28-30, the torsional vibration damper assembly 320 includes a torsional vibration damper 21 operatively coupled to the turbine wheel 15 and the turbine hub 24 of the torque converter 14, and a dynamic absorber 370 operatively connected to the torsional vibration damper 21.

The dynamic absorber 370 includes a substantially annular first connecting plate 372A non-rotatably attached to the intermediate member 34 coaxially with the rotational axis X, a substantially annular second connecting plate 372B non-rotatably attached to the first connecting plate 372A coaxially with the rotational axis X, a substantially annular inertial member (or absorber mass) 374 rotatable relative to the first and second connecting plates 372A, 372B coaxially with the rotational axis X, and a plurality of circumferentially acting absorber elastic members 376 interposed between the first and second connecting plates 372A, 372B and the inertial member 374. The absorber elastic members 376 are elastically coupling the first and second connecting plates 372A, 372B to the inertial member 374. Each of the first and second connecting plates 372A, 372B is preferably made as a single or unitary component. Preferably, each of the first and second connecting plates 372A, 372B is integrally press-formed from a single sheet-metal blank. The first and second connecting plates 372A, 372B are non-rotatably attached to each other by appropriate means, such as by fasteners 71 or welding. Further according to the fourth exemplary embodiment of the present invention, each of the absorber elastic members 376 is in the form of helical (or coil) spring having a principal axis oriented substantially circumferentially.

The inertial member 374 includes a substantially annular support (or connection) portion 386 and a substantially annular inertial portion 388 formed integrally with the support portion 386. The inertial member 374 with the support portion 386 and the inertial portion 388 is an integral part, e.g., made of a single-piece or unitary component, but may be separate components fixedly connected together. Preferably, the inertial member 374 is integrally made by stamping in an L-shape or by rolled forming from a rolled strip. The support portion 386 of the inertial member 374 is elastically and rotatably coupled to the first and second connecting plates 372A, 372B through the absorber elastic members 376 interposed circumferentially between the first and second connecting plates 372A, 372B and the inertial member 374.

Moreover, the support portion 386 of the inertial member 374 has a substantially annular, for example cylindrical, radially inner peripheral surface 387. Also, each of the first and second connecting plates 372A, 372B has a substantially annular, for example cylindrical, radially outer peripheral (or radial support) surface 373A, 373B, respectively, as best shown in FIG. 29. The radially inner peripheral surface 387 of the support portion 386 of the inertial member 374 is rotationally slidably supported in the radial direction by the radial support surfaces 373A, 373B of the first and second connecting plates 372A, 372B, respectively, as best shown in FIG. 29. In other words, the inertial member 374 is radially, rotationally guided and centered relative to the rotational axis X by the radial support surfaces 373A, 373B of the first and second connecting plates 372A, 372B.

As illustrated in FIGS. 28 and 29, the inertial portion 388 of the inertial member 374 has a thickness and a mass substantially larger than the thickness and mass of the support portion 386 thereof. Moreover, the support portion 386 of the inertial member 374 has a pair of first and second annular grooves 392A and 392B, respectively, recessed into each of axially opposite outer surfaces of the support portion 386 so that the first annular groove 392A faces the first connecting plate 272A, while the second annular groove 392B faces the second connecting plate 372B.

As best shown in FIG. 29, each of the first and second connecting plates 372A, 372B has a plurality of driving tabs 394A, 394B generally axially toward the support portion 386 of the inertial member 374 and each other. The driving tabs 394A, 394B of each of the first and second connecting plates 372A, 372B are circumferentially equidistantly spaced from one another, and engage circumferential distal ends of the absorber elastic members 376.

In an assembled condition, the driving tabs 394A, 394B of the first and second connecting plates 372A, 372B extend into the first and second annular grooves 392A, 392B of the support portion 386 of the inertial member 374. Moreover, axially inner peripheral surfaces 396A, 396B of the first and second connecting plates 372A, 372B, respectively, rotationally slidably engage the support portion 386 of the inertial member 374 from the axially opposite sides thereof, as best shown in FIG. 29. In other words, the axially inner peripheral surfaces 396A, 396B of the first and second connecting plates 372A, 372B, respectively, axially, rotationally support (or guide) the support portion 386 of the inertial member 374.

Further according to the fourth exemplary embodiment of the present invention, the first connecting plate 372A has one or more mounting portions 380 each formed integral with the first connecting plate 372A, and one or more substantially annular, for example cylindrical, guided portions 378 each formed integral with one of the mounting portions 380. According to the present invention, each of the guided portions 378 extends substantially circumferentially and axially, while each of the mounting portions 380 extends substantially radially inwardly and is disposed adjacent to the intermediate member 34. Moreover, the guided portion 378 has a circumferentially extending guided surface 378s facing and rotationally slidingly engaging the guiding surface 39s of the corresponding guiding flange 39 of the first retainer plate 36A of the torsional vibration damper 21 and define an axial contact surface between the guiding flange 39 of the first retainer plate 36A and the guided portion 378 of the first connecting plate 372A, as best shown in FIGS. 28 and 30. In other words, the dynamic absorber 370 is radially, rotationally guided and centered relative to the rotational axis X by rotationally slidingly engaging the first retainer plate 36A of the torsional vibration damper 21, as best shown in FIGS. 28 and 30. Preferably, the first and second connecting plate 372A is integrally press-formed from a single sheet-metal blank.

The dynamic absorber 370 according to the fourth exemplary embodiment of the present invention allows the inertial member 374 to increase its configuration where the engagement of the inertial member 374 by the two axially opposite connecting plates 372A, 372B is adapted to a larger thickness of the inertial portion 388 of the inertial member 374, then in the other embodiments. Also, in the fourth exemplary embodiment of the present invention, guiding of the absorber elastic members 376 is optimized.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torsional vibration damper assembly for a hydrokinetic torque coupling device, comprising:
a torsional vibration damper; and
a dynamic absorber operatively connected to the torsional vibration damper;
the torsional vibration damper comprising:
a driven member rotatable about a rotational axis;
a first retainer plate rotatable relative to the driven member coaxially with the rotational axis;
an intermediate member rotatable relative to the first retainer plate and the driven member about the rotational axis; and
a plurality of damper elastic members interposed in series relative to each other between the first retainer plate and the driven member, the damper elastic members interposed between the first retainer plate and the intermediate member and between the intermediate member and the driven member, the damper elastic members elastically coupling the first retainer plate to the driven member;
the dynamic absorber including
an annular inertial member coaxial with the rotational axis;
a first connecting plate non-moveably mounted to the intermediate member of the torsional vibration damper; and
a plurality of circumferentially acting absorber elastic members interposed between the first connecting plate and the inertial member, the absorber elastic members elastically coupling the first connecting plate to the inertial member;
the dynamic absorber mounted to the torsional vibration damper coaxially with the rotational axis and rotationally guided and centered relative to the rotational axis by one of the first retainer plate and the driven member of the torsional vibration damper;
the dynamic absorber being rotatable relative to the first retainer plate;
the first connecting plate of the dynamic absorber being rotationally guided and centered relative to the rotational axis by directly rotationally slidingly engaging the first retainer plate or the driven member of the torsional vibration damper;
the inertial member rotatable relative to the first connecting plate coaxially with the rotational axis.

2. The torsional vibration damper assembly as defined in claim 1, further comprising a second retainer plate non-moveably secured to the first retainer plate coaxially with the rotational axis, wherein the first retainer plate and the second retainer plate are mounted adjacent to axially opposite surfaces of the driven member, and wherein the second retainer plate is operatively connected to the damper elastic members so that the second retainer plate is elastically coupled to the driven member.

3. The torsional vibration damper assembly as defined in claim 1, wherein the first connecting plate is non-moveably attached to the intermediate member, and wherein the dynamic absorber is guided and centered coaxially with the rotational axis by the first retainer plate of the torsional vibration damper rotationally slidingly engaging the first connecting plate of the dynamic absorber.

4. The torsional vibration damper assembly as defined in claim 3, wherein the first retainer plate of the torsional vibration damper has at least one circumferentially extending guiding flange, the at least one guiding flange axially extends toward the first connecting plate of the dynamic absorber.

5. The torsional vibration damper assembly as defined in claim 4, wherein the first connecting plate of the dynamic absorber has at least one radially extending mounting portion non-moveably attached to the intermediate member and at least one guided portion extending both circumferentially and axially from the at least one mounting portion; wherein the at least one guided portion rotationally slidingly engages the at least one guiding flange of the first retainer plate; and wherein the at least one guided portion is formed integral with the at least one mounting portion.

6. The torsional vibration damper assembly as defined in claim 4, wherein the first connecting plate of the dynamic absorber has a plurality of radially extending mounting portions non-moveably attached to the intermediate member and a single, substantially annular guided portion rotationally slidingly engages the at least one guiding flange of the first retainer plate; and wherein the annular guided portion of the first connecting plate of the dynamic absorber is formed integral with the plurality of the mounting portions.

7. The torsional vibration damper assembly as defined in claim 1, wherein the driven member has a guiding flange extending both circumferentially and axially, and wherein the first connecting plate of the dynamic absorber has at least one radially extending mounting portion non-moveably attached to the intermediate member of the torsional vibration damper and at least one circumferentially extending guided portion rotationally slidingly engaging the guiding flange of the driven member.

8. The torsional vibration damper assembly as defined in claim 1, wherein the inertial member is rotationally guided and centered relative to the rotational axis by a substantially annular support surface of the first connecting plate.

9. The torsional vibration damper assembly as defined in claim 1, wherein the dynamic absorber further includes a second connecting plate non-rotatably attached to the first connecting plate so that the inertial member and the absorber elastic members are interposed axially between the first and second connecting plates.

10. The torsional vibration damper assembly as defined in claim 9, wherein the inertial member is rotationally guided and centered relative to the rotational axis by a substantially annular support surface of at least one of the first and second connecting plates.

11. The torsional vibration damper assembly as defined in claim 9, wherein the inertial member is rotationally guided and centered relative to the rotational axis by substantially annular support surfaces of the first and second connecting plates.

12. The torsional vibration damper assembly as defined in claim 9, wherein the inertial member is rotationally guided and centered relative to the rotational axis by substantially annular support surface of the second connecting plate only.

13. The torsional vibration damper assembly as defined in claim 1, wherein the inertial member includes a support portion elastically coupled to the first connecting plate and an inertial portion formed integrally with the support portion; and wherein the inertial portion of the inertial member has a thickness and a mass substantially bigger than a thickness and a mass of the support portion thereof.

14. The torsional vibration damper assembly as defined in claim 13, wherein the support portion extends substantially radially and the inertial portion extends substantially axially outwardly from the support portion so that the inertial member has an L-shape.

15. The torsional vibration damper assembly as defined in claim 9, wherein the dynamic absorber further includes an anti-friction washer disposed axially between the inertial member and at least one of the first connecting plate and the second connecting plate of the dynamic absorber.

16. A hydrokinetic torque coupling device for coupling together a driving shaft and a driven shaft, the torque coupling device comprising:
- an impeller coaxial aligned with a rotational axis and comprising an impeller shell;
- a casing comprising the impeller shell and a casing shell interconnected to and non-rotatable relative to the impeller shell;
- a turbine coaxially aligned with and drivable by the impeller, the turbine comprising a turbine shell;
- a stator situated between the impeller and the turbine;
- a torsional vibration damper;
- a turbine hub; and
- a dynamic absorber operatively connected to the torsional vibration damper;
- the torsional vibration damper comprising:
  - a driven member rotatable about the rotational axis;
  - a first retainer plate rotatable relative to the driven member coaxially with the rotational axis;
  - an intermediate member rotatable relative to the first retainer plate and the driven member about the rotational axis; and
  - a plurality of damper elastic members interposed in series relative to each other between the first retainer plate and the driven member, the damper elastic members interposed between the first retainer plate and the intermediate member and between the intermediate member and the driven member, the damper elastic members elastically coupling the first retainer plate to the driven member;
- the turbine hub non-rotatably coupled to the turbine shell and the driven member of the torsional vibration damper;
- the dynamic absorber including
  - an annular inertial member coaxial with the rotational axis;
  - a first connecting plate non-moveably mounted to the intermediate member of the torsional vibration damper; and
  - a plurality of circumferentially acting absorber elastic members interposed between the first connecting plate and the inertial member, the absorber elastic members elastically coupling the first connecting plate to the inertial member;
- the dynamic absorber mounted to the torsional vibration damper coaxially with the rotational axis and rotationally guided and centered relative to the rotational axis by one of the first retainer plate and the driven member of the torsional vibration damper;
- the dynamic absorber being rotatable relative to the first retainer plate;
- the first connecting plate of the dynamic absorber being rotationally guided and centered relative to the rotational axis by directly rotationally slidingly engaging the first retainer plate or the driven member of the torsional vibration damper;
- the inertial member rotatable relative to the first connecting plate coaxially with the rotational axis.

17. The hydrokinetic torque coupling device as defined in claim 16, further comprising a lock-up clutch selectively interconnecting the turbine and the casing; wherein the lock-up clutch includes a locking piston configured to move axially toward and away from the casing; and wherein the first retainer plate is operatively connected to the locking piston of the lock-up clutch.

18. A method for assembling a torsional vibration damper assembly for a hydrokinetic torque coupling device, the method comprising the steps of:
- providing a preassembled torsional vibration damper comprising:
  - a driven member rotatable about the rotational axis;
  - a first retainer plate rotatable relative to the driven member coaxially with the rotational axis;
  - an intermediate member rotatable relative to the first retainer plate and the driven member about the rotational axis; and
  - a plurality of damper elastic members interposed in series relative to each other between the first retainer plate and the driven member, the damper elastic members interposed between the first retainer plate and the intermediate member, and between the intermediate member and the driven member, the damper elastic members elastically coupling the first retainer plate to the driven member;
- providing a preassembled dynamic absorber including an annular inertial member, a first connecting plate non-moveably mounted to the intermediate member of the torsional vibration damper, and a plurality of circumferentially acting absorber elastic members interposed between the first connecting plate and the inertial member, the absorber elastic members elastically coupling the first connecting plate to the inertial member; and
- mounting the dynamic absorber to the torsional vibration damper coaxially with the rotational axis so that the dynamic absorber being rotatable relative to the first retainer plate, the first connecting plate of the dynamic absorber being rotationally guided and centered relative to the rotational axis by directly rotationally slidingly engaging the first retainer plate or the driven member of the torsional vibration damper, and the inertial member rotatable relative to the first connecting plate coaxially with the rotational axis.

* * * * *